US007683528B2

(12) United States Patent
Tsukamoto et al.

(10) Patent No.: US 7,683,528 B2
(45) Date of Patent: Mar. 23, 2010

(54) STRUCTURE, ELECTRON EMITTING DEVICE, SECONDARY BATTERY, ELECTRON SOURCE, AND IMAGE DISPLAY DEVICE

(75) Inventors: Takeo Tsukamoto, Atsugi (JP); Shin Kitamura, Yokohama (JP); Oichi Kubota, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 763 days.

(21) Appl. No.: 11/244,175

(22) Filed: Oct. 6, 2005

(65) Prior Publication Data

US 2007/0188067 A1 Aug. 16, 2007

(30) Foreign Application Priority Data

Oct. 14, 2004 (JP) .............................. 2004-299769

(51) Int. Cl.
*H01J 1/02* (2006.01)
*H01J 1/62* (2006.01)
*H01J 63/04* (2006.01)

(52) U.S. Cl. ...................... 313/309; 313/495; 313/496; 313/497

(58) Field of Classification Search ......... 313/495–497, 313/309
See application file for complete search history.

(56) References Cited

U.S. PATENT DOCUMENTS

| 4,900,483 | A | 2/1990 | Witzke et al. ............... 264/29.2 |
|---|---|---|---|
| 4,904,895 | A | 2/1990 | Tsukamoto et al. ......... 313/336 |
| 5,786,658 | A | 7/1998 | Tsukamoto et al. ......... 313/309 |
| 5,847,495 | A | 12/1998 | Yamanobe et al. .......... 313/310 |
| 5,973,444 | A | 10/1999 | Xu et al. ..................... 313/309 |
| 5,986,389 | A | 11/1999 | Tsukamoto ................. 313/310 |
| 6,147,449 | A | 11/2000 | Iwasaki et al. .............. 313/495 |
| 6,171,162 | B1 | 1/2001 | Iwasaki et al. ................. 445/6 |
| 6,179,678 | B1 | 1/2001 | Kishi et al. .................. 445/24 |
| 6,184,610 | B1 | 2/2001 | Shibata et al. .............. 313/309 |
| 6,231,413 | B1 | 5/2001 | Tsukamoto .................. 445/24 |
| 6,246,168 | B1 | 6/2001 | Kishi et al. ................. 313/495 |

(Continued)

FOREIGN PATENT DOCUMENTS

EP 0 433 507 A1 6/1991

(Continued)

OTHER PUBLICATIONS

Japan Applied Physics vol. 42 to Yang.*

(Continued)

*Primary Examiner*—Toan Ton
*Assistant Examiner*—Zachary Snyder
(74) *Attorney, Agent, or Firm*—Fitzpatrick, Cella, Harper & Scinto

(57) ABSTRACT

The present invention prevents the oxidization of a member of carbon fibers and improves the electric connection between the carbon fibers and the member of carbon fibers. In the present invention, a member 5 of carbon fibers 4 includes: a first element selected from the group consisting of IVa group elements and Va group elements; a second element selected from the group consisting of C, Al, Si, Cr, and Zr; and N. Preferably, the first element is Ti. More preferably, the member 5 includes Al or Si and the ratio of Al or Si to Ti is not less than 10 atm % and not more than 30 atm %.

6 Claims, 17 Drawing Sheets

U.S. PATENT DOCUMENTS

| | | | |
|---|---|---|---|
| 6,288,494 B1 | 9/2001 | Tsukamoto et al. | 315/169.1 |
| 6,333,598 B1 * | 12/2001 | Hsu et al. | 313/495 |
| 6,435,928 B1 | 8/2002 | Tsukamoto | 445/24 |
| 6,472,814 B1 | 10/2002 | Yamanobe et al. | 313/495 |
| 6,515,640 B2 | 2/2003 | Tsukamoto et al. | 345/75.2 |
| 6,608,437 B1 | 8/2003 | Kishi et al. | 313/495 |
| 6,624,589 B2 | 9/2003 | Kitamura et al. | 315/169.3 |
| 6,626,719 B2 | 9/2003 | Ono et al. | 445/24 |
| 6,628,053 B1 | 9/2003 | Den et al. | 313/310 |
| 6,812,634 B2 * | 11/2004 | Murakami et al. | 313/495 |
| 6,843,696 B2 | 1/2005 | Kitamura et al. | 445/24 |
| 6,848,962 B2 | 2/2005 | Kitamura et al. | 445/24 |
| 6,853,126 B2 | 2/2005 | Nomura | 313/492 |
| 6,858,990 B2 | 2/2005 | Tsukamoto | 315/169.1 |
| 6,900,581 B2 | 5/2005 | Kyogaku et al. | 313/310 |
| 6,933,664 B2 | 8/2005 | Kitamura et al. | 313/309 |
| 6,948,995 B2 | 9/2005 | Ishikura et al. | 445/51 |
| 7,012,362 B2 | 3/2006 | Kawate et al. | 313/495 |
| 7,034,444 B2 | 4/2006 | Tsukamoto | 313/309 |
| 7,057,336 B2 | 6/2006 | Kishi et al. | 313/495 |
| 7,064,475 B2 | 6/2006 | Kuroda et al. | 313/311 |
| 7,067,336 B1 | 6/2006 | Kyogaku et al. | 438/20 |
| 7,074,105 B2 | 7/2006 | Kawate et al. | 445/51 |
| 7,074,380 B2 | 7/2006 | Iwaki et al. | 423/447.3 |
| 7,094,123 B2 | 8/2006 | Oyama et al. | 445/50 |
| 7,402,206 B2 * | 7/2008 | Isberg et al. | 117/84 |
| 2002/0057045 A1 | 5/2002 | Tsukamoto | 313/309 |
| 2002/0060516 A1 | 5/2002 | Kawate | 313/495 |
| 2002/0074947 A1 | 6/2002 | Tsukamoto | 315/169.3 |
| 2003/0006684 A1 | 1/2003 | Kawate | 313/311 |
| 2004/0048057 A1 | 3/2004 | Kendall | 313/311 |
| 2004/0060477 A1 | 4/2004 | Iwaki et al. | 106/472 |
| 2004/0063839 A1 | 4/2004 | Kawate. | 524/439 |
| 2004/0183428 A1 | 9/2004 | Kyogaku | |
| 2004/0183757 A1 | 9/2004 | Oyama et al. | 345/75.2 |
| 2004/0192151 A1 | 9/2004 | Tsukamoto et al. | |
| 2004/0232467 A1 * | 11/2004 | Otsuki et al. | 257/303 |
| 2004/0245904 A1 | 12/2004 | Kitamura et al. | 313/310 |
| 2005/0032255 A1 | 2/2005 | Kitamura et al. | 438/20 |
| 2005/0059313 A1 | 3/2005 | Tsukamoto | 445/24 |
| 2005/0116601 A1 | 6/2005 | Shimazu et al. | 313/309 |
| 2005/0134161 A1 | 6/2005 | Kitamura et al. | |
| 2005/0287689 A1 | 12/2005 | Iwaki et al. | 438/22 |
| 2006/0009107 A1 | 1/2006 | Tsukamoto | 445/23 |
| 2006/0186781 A1 | 8/2006 | Kuroda et al. | 313/311 |
| 2006/0189243 A1 | 8/2006 | Kishi et al. | 445/24 |
| 2006/0208654 A1 | 9/2006 | Kawate et al. | 313/169.2 |
| 2006/0228478 A1 | 10/2006 | Iwaki et al. | 427/249.1 |
| 2006/0228977 A1 | 10/2006 | Oyama et al. | 445/50 |

FOREIGN PATENT DOCUMENTS

| | | |
|---|---|---|
| EP | 0 913 508 A2 | 5/1999 |
| EP | 1 187 161 A2 | 3/2002 |
| EP | 1 245 704 A2 | 10/2002 |
| EP | 1 291 889 A2 | 3/2003 |
| EP | 1 291 891 A2 | 3/2003 |
| JP | 11-139815 | 5/1999 |
| JP | 2002-115057 | 4/2002 |
| JP | 2002-289087 | 10/2002 |
| JP | 2003-277033 | 10/2003 |
| JP | 2004-83293 | 3/2004 |
| JP | 2004-107162 | 4/2004 |
| JP | 2004-115959 | 4/2004 |

OTHER PUBLICATIONS

U.S. Appl. No. 11/150,207, filed Jun. 13, 2005.

* cited by examiner

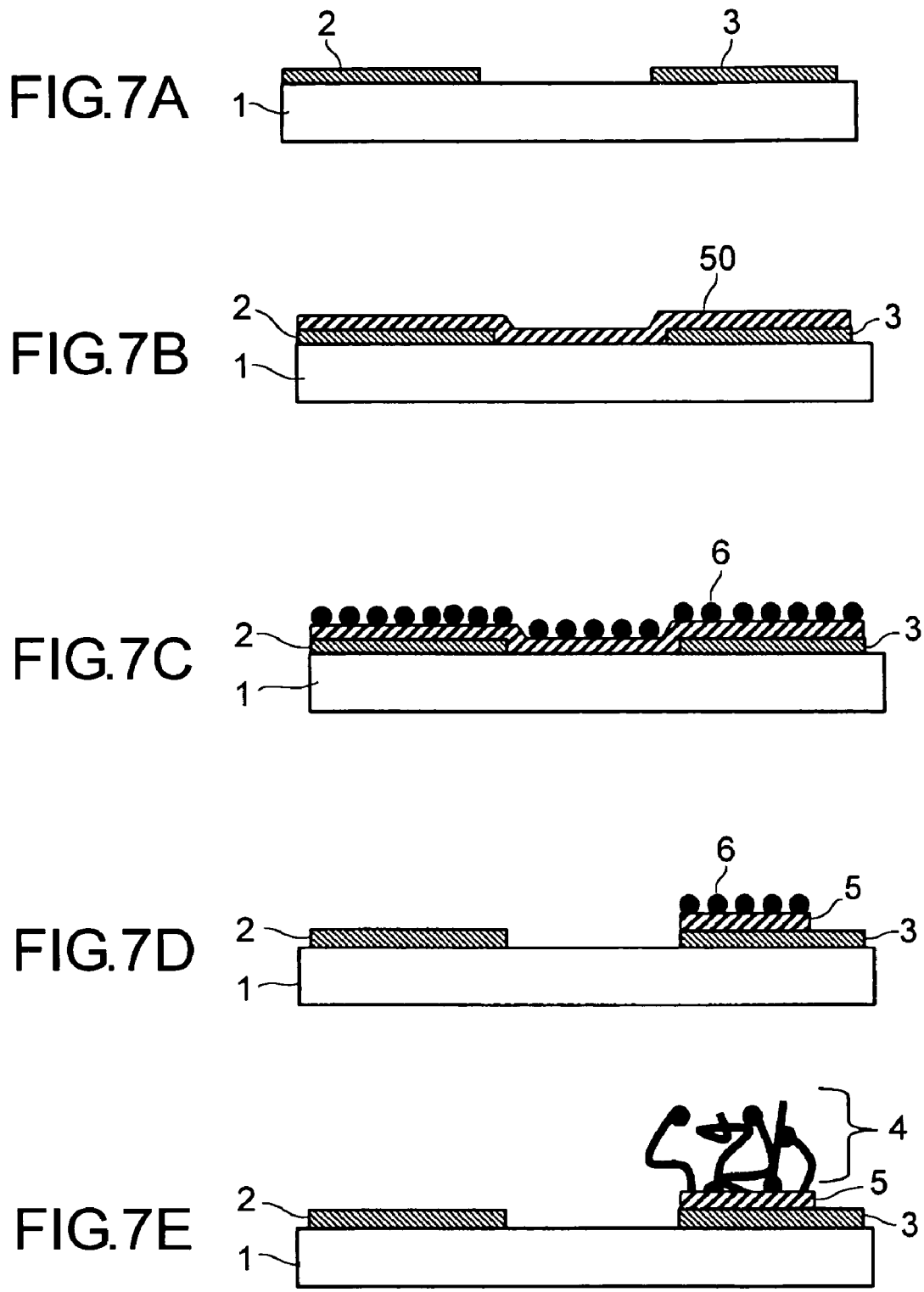

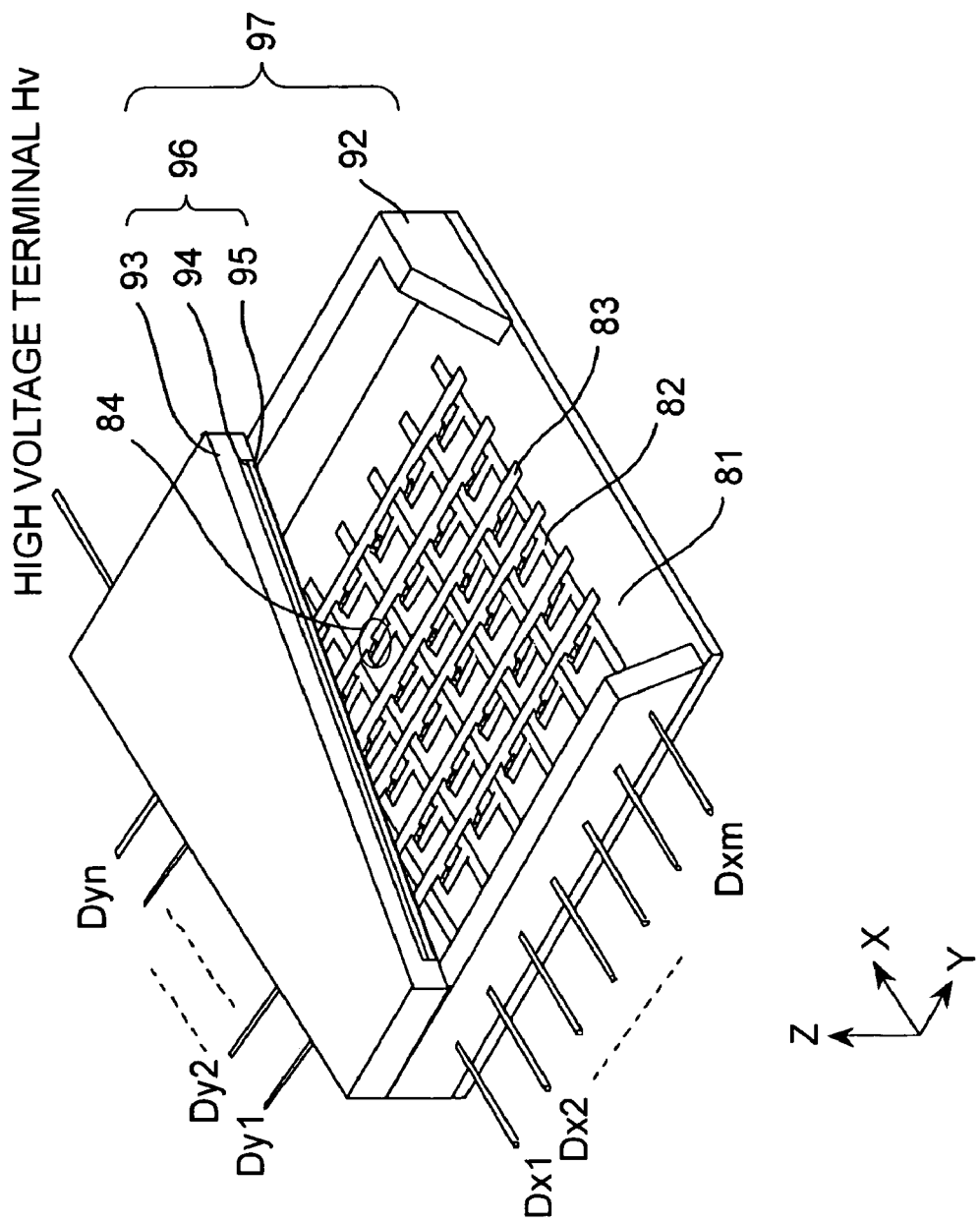

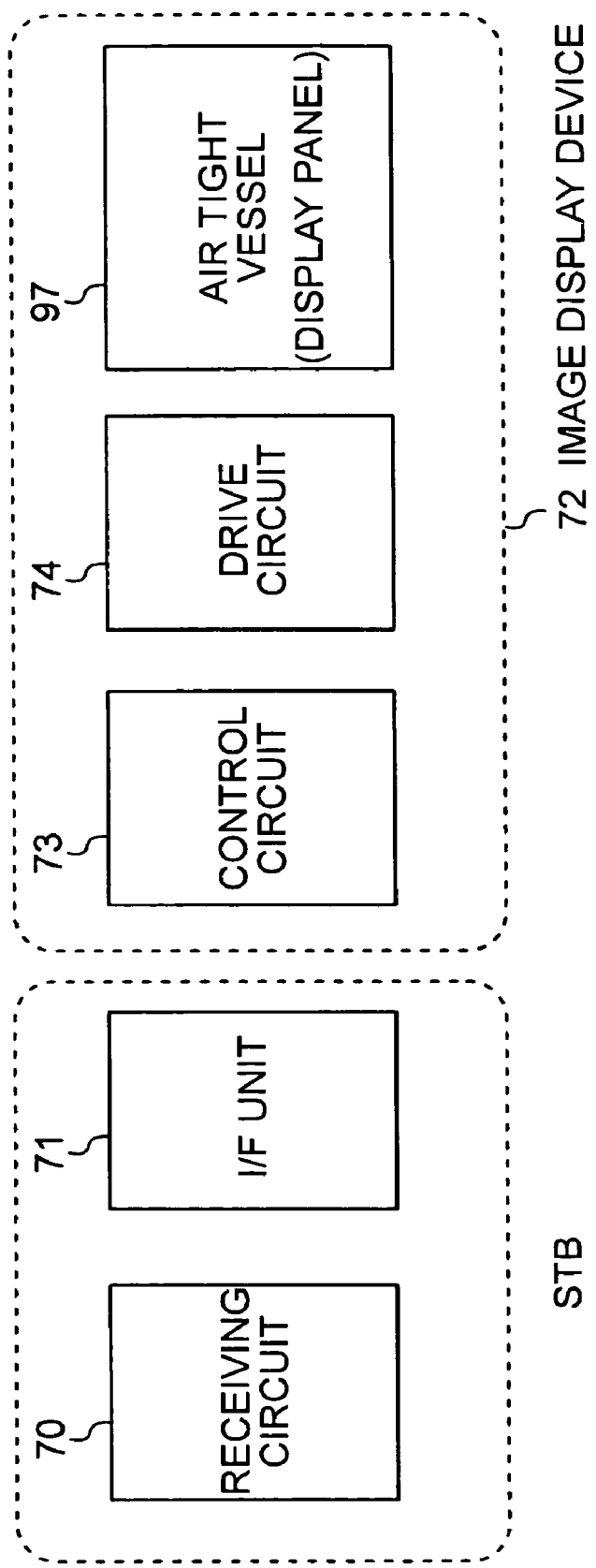

STRUCTURE, ELECTRON EMITTING DEVICE, SECONDARY BATTERY, ELECTRON SOURCE, AND IMAGE DISPLAY DEVICE

BACKGROUND OF THE INVENTION

1. Field of the Invention

The present invention relates to a structure, an electron emitting device, a secondary battery, an electron source, and an image display device each of which uses carbon fibers.

2. Description of the Related Art

In recent years, field emission type electron emitting devices include an electron emitting device using carbon fibers as electron emitting bodies. Because of such a field enhancement effect resulting from shape that is produced by using carbon fibers as electron emitting bodies, the electron emitting device using carbon fibers as electron emitting bodies can emit electrons from the electron emitting bodies in a lower electric field intensity than an electron emitting body made of carbon or the like shaped like a film (in the shape of a plane).

Methods for forming carbon fibers used for electron emitting bodies include a method for applying carbon fibers prepared in advance to the surface of an electrode (cathode electrode), a method for vapor-depositing carbon fibers by the use of an electrode (cathode electrode) having catalytic particles placed on the surface thereof, and the like. In the case of forming carbon fibers by the vapor deposition method, it is necessary to consider the electric and physical connection between the carbon fibers and the electrode (cathode electrode). Moreover, it is preferable that a material having high conductivity is used as the electrode (cathode electrode), so that there is proposed a method for placing another conductive body (supporting member) different from the electrode (cathode electrode) on the electrode (cathode electrode) and further placing catalytic particles on this supporting member and then forming carbon fibers by a vapor deposition method.

In a Japanese Unexamined Patent Publication No. 11-139815 is disclosed a technology that places a film, which is formed by dispersing catalytic ultra-fine particles containing at least one metal selected from Fe, Co, and Ni into a material whose main component is at least one metal selected from Cu, Ag, Au, and Cr, on a substrate made of Si or the like and vapor-deposits carbon nanotubes by the use of the above-mentioned catalytic particles.

Moreover, in the Japanese Unexamined Patent Publication No. 2002-289087 is disclosed a technology that places a member on an electrode (cathode electrode) and vapor-deposits carbon nanotubes on this member by the use of catalytic particles. It is disclosed that a nitride of at least one element selected from Ti, Zr, Ta, and Nb, an oxide of at least one element selected from Ti, Zr, Ta, and Nb, or a mixture of the nitride and the oxide is used as the supporting member of the carbon fibers.

SUMAMRY OF THE INVENTION

However, in the Japanese Unexamined Patent Publication No. 11-139815, the metal having catalytic particles dispersed therein and the substrate of Si are subjected to a process for growing carbon fibers and hence have an oxide film easily formed on their surfaces. Since silicon oxide is an insulating material, when the oxide film becomes thick, the oxide film sometimes prevents the electric connection between the metal and the substrate and the carbon fibers. In addition to Si, an oxide material of an element having an electron configuration of atom having no d-orbital electron such as Al is an insulating material, so that when this material is used as the material of the supporting member of the carbon fibers, it is necessary to reduce the thickness of an oxide film formed on the surface of the supporting member.

Moreover, when a material including TiN, ZrN, TaN, or NbN is used as the supporting member of the carbon fibers as disclosed in the Japanese Unexamined Patent Publication No. 2002-289087, there are cases where the following problems occur. That is, when carbon fibers are grown by the use of catalytic particles by a vapor deposition method, if a metal is used as a catalyst, there is a case where a catalytic metal might diffuse into the supporting member. When the catalytic metal diffuses into the supporting member in this manner, there is a case where the diameters of the catalytic particles might vary and where the formed carbon fibers might hence vary in diameter, length, crystalline structure, and the like. Moreover, when an alloy catalyst is used as the catalyst, if the diffusion speeds into the supporting member of elements constituting the alloy are different from each other, a composition ratio in the alloy catalyst might vary. Therefore, when the composition ratio of elements constituting the alloy varies from an initial desired state, the formed carbon fibers also vary in diameter, length, crystalline structure, and the like, which sometimes causes problems of degradation and variations in electron emission characteristics.

An object of the present invention is to prevent the oxidization of a member for supporting carbon fiber and to improve the electric connection between the carbon fiber and the member for supporting carbon fiber. Moreover, another object of the present invention is to realize an electron emitting device, an electron source, an image display device, and a secondary battery each of which is reduced in degradation and variations in electron emission characteristics by preventing a catalytic material from diffusing into the member for supporting the carbon fiber and by forming carbon fibers of desired shapes on the surface of the member with good reproducibility.

To solve the above-mentioned problems, the present invention adopts the following construction.

According to the first aspect of the present invention, there is provided a structure comprising: a member; and a carbon fiber placed on the member (or a carbon fiber formed on the member), wherein the member includes: (A) a first element selected from the group consisting of IVa group elements and Va group elements; (B) a second element selected from the group consisting of C, Al, Si, Cr and Zr; and (C) N.

In the above-mentioned first invention, it is preferable "that the second element is Al or Si". Moreover, in the above-mentioned first invention, it is also preferable "that the first element is Ti" and it is more preferable "that in the above-mentioned member, the ratio of Al or Si to Ti is not less than 10 atm % and not more than 30 atm %".

Moreover, according to the second aspect of the present invention, there is provided an electron emitting device comprising: a cathode electrode; a member placed on the cathode electrode (or a member disposed on the cathode electrode); and a carbon fiber placed on the member (or a carbon fiber formed on the member), wherein the member includes: (A) a first element selected from the group consisting of IVa group elements and Va group elements; (B) Al or Si; and (C) N.

Moreover, according to the third aspect of the present invention, there is provided a secondary battery comprising: a cathode electrode; a member placed on (disposed on) the cathode electrode; a carbon fiber placed on (formed on) the member; and an anode electrode, wherein the member includes: (A) a first element selected from the group consisting of IVa group elements and Va group elements; (B) Al or Si; and (C) N.

Moreover, the present invention is characterized by "an electron source including the plurality of electron emitting devices", "an image display device including the electron source and a light emitting body that is irradiated with electrons emitted from the electron source to thereby emit light", and "an apparatus including: a receiver that outputs at least one of image information, character information, and sound information, which are included in a received signal; and the above-mentioned image display device connected to the above-mentioned receiver".

Moreover, according to the fourth aspect of the present invention, there is provided a manufacturing method of a carbon fiber that includes a step of growing carbon fibers on a member having a catalyst placed thereon by the use of the catalyst by a vapor deposition method, and is characterized in that the above-mentioned member includes: (A) a first element selected from the group consisting of IVa group elements and Va group elements; (B) a second element selected from the group consisting of C, Al, Si, Cr, and Zr; and (C) N.

In the above-mentioned fourth invention, it is preferable "that the second element is Al or Si". Moreover, in the above-mentioned fourth invention, it is also preferable "that the first element is Ti" and it is more preferable "that in the above-mentioned member, the ratio of Al or Si to Ti is not less than 10 atm % and not more than 30 atm %". Furthermore, in the above-mentioned fourth invention, it is also preferable "that the above-mentioned catalyst includes at least one element selected from the group consisting of Pd, Ni, Fe, and Co", or that "the above-mentioned catalyst includes Co and Pd".

Moreover, the present invention is also characterized by "a manufacturing method of an electron emitting device including a first electrode, a member disposed on the first electrode, and a carbon fiber placed on the member, wherein the above-mentioned carbon fiber is manufactured by the above-mentioned fourth invention", "a manufacturing method of an electron source including a plurality of electron emitting devices, wherein each of the plurality of electron emitting devices is manufactured by the above-mentioned manufacturing method of an electron emitting device", "a manufacturing method of an image display device including an electron source and a light emitting body which is irradiated with electrons emitted from the electron source to thereby emit light, wherein the above-mentioned electron source is manufactured by the above-mentioned manufacturing method of an electron source", "a manufacturing method of an apparatus, including a step of connecting a receiver outputting at least one of image information, character information, and sound information, which are included in a received signal, to an image display device, wherein the above-mentioned image display device is manufactured by the above-mentioned manufacturing method of an image display device", and "a manufacturing method of a secondary battery including a cathode electrode, a member disposed on the cathode electrode, a carbon fiber placed on the member, and an anode electrode, wherein the above-mentioned carbon fibers are manufactured by the above-mentioned fourth invention".

It is only essential that the member of the present invention is a substance for supporting the carbon fiber. The shapes of the member include the shapes of, for example, a substrate, a film, a sheet, a layer, and a particle.

According to the present invention, it is possible to keep the electric connection between the carbon fiber and the electrode with stability for a long time. As a result, it is possible to realize an electron emitting device excellent in electron emission characteristics, an image display device having high brightness and little variations, an apparatus such as a television apparatus, and a secondary battery that can draw out a stable current.

BRIEF DESCRIPTION OF THE DRAWINGS

FIG. 7A to FIG. 7E are diagrams showing the steps of manufacturing the electron emitting device according to the example 1.

FIG. 11 is a diagram showing an example of the construction of an externally enclosed unit (display panel) using the electron source.

FIG. 12 is a diagram showing an example of the construction of a television apparatus using the externally enclosed unit (display panel).

DETAILED DESCRIPTION OF THE PREFERRED EMBODIMENTS

The preferred embodiments of the present invention will be hereinafter described by way of example with reference to the drawings. However, it is not intended to limit the scope of the present invention only to the sizes, materials, shapes, relative positions, and the like of constituent parts described in these embodiments, unless otherwise specified.

Figure 1A:
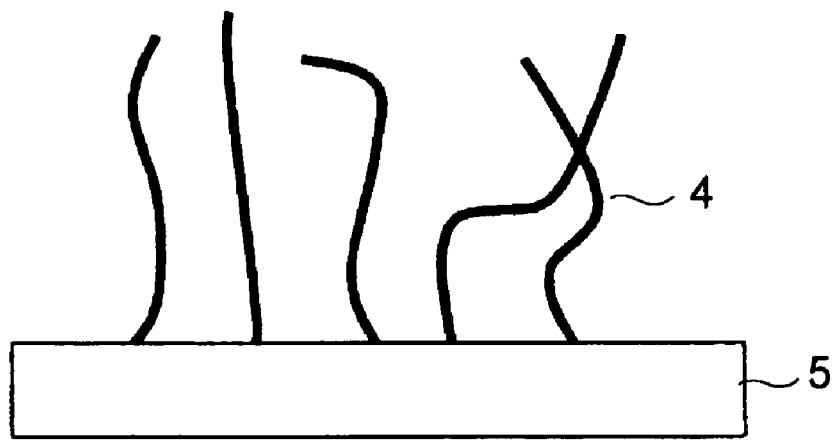
FIG. 1A and FIG. 1B are schematic diagrams showing the simplified construction of the present invention.
Figure 1B:

FIG. 1A and FIG. 1B are schematic diagram showing a simplified construction of the present invention. In FIG. 1A and FIG. 1B, a reference numeral 4 denotes a carbon fiber. Each carbon fiber 4 has two ends (both ends) in its axial direction (also referred to as direction of length or direction of growth) and one end is connected to the surface of a member 5. FIG. 1A shows a case where the carbon fiber is of a bent shape and FIG. 1B shows a case where the carbon fiber is shaped like a nearly straight line. The carbon fiber of the shape shown in FIG. 1B is commonly referred to as a carbon nanotube. Then, in the present invention, the above-mentioned member 5 includes: (A) one kind of element (a first element) selected from the group consisting of IVa group elements or Va group elements (hereinafter referred to as "base material"): (B) one kind of element (a second element) selected from the group consisting of C, Al, Si, Cr, and Zr (hereinafter referred to as "added material"); and (C) nitrogen. Naturally, the member 5 has electrical conductivity.

"Carbon fibers" in the present invention include a carbon nanotube, a graphite nano fiber, an amorphous carbon fiber, a diamond fiber, and the like. Moreover, a "carbon fiber" is a fiber containing carbon and preferably is a fiber whose main component is carbon. The carbon fiber has two ends (both ends) in its axial direction. When the carbon fiber is shaped like a straight line, as shown in FIG. 1B, these two ends (both ends) can be also called "two ends opposed to each other in the axial direction". Moreover, in the present invention, because of a need to pass an electric current through the carbon fiber, the diameter of the carbon fiber is preferably not less than 1 nm and not more than 1 μm, and more preferably not less than 1 nm and not more than 500 μm, and still more preferably not less than 5 nm and not more than 100 nm in terms of realizing stable current supply. Furthermore, preferably, the length of the carbon fiber is at least 10 times larger than the diameter thereof. When the carbon fiber is applied to a field emission type electron emitting device, in terms of producing an effect of multiplying field intensity to be applied, the length of the carbon fiber is more preferably 50 or more times larger than the diameter thereof and still more preferably 100 or more times larger than the diameter thereof.

Figure 2A:
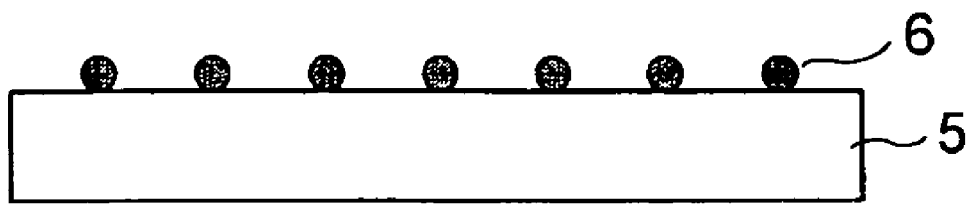
FIG. 2A and FIG. 2B are diagrams showing the steps of manufacturing carbon fibers shown in FIG. 1A and FIG. 1B.
Figure 2B:

The carbon fiber shown in FIGS. 1A and 1B can be typically formed by the following step 1 and step 2 as shown in FIGS. 2A and 2B in the present invention. (Step 1): Catalytic particles 6 are placed on the surface of the member 5 (FIG. 2A). (Step 2): Then, the catalytic particles 6 placed on the member 5 are made to react with the raw material of the carbon fiber 4 to grow the carbon fibers 4 on the member 5 (FIG. 2B).

The present inventors studied the material of the member 5 as follows: catalytic particles were placed on a member of various compositions and gas containing carbon was thermally decomposed by the use of these catalytic particles to form carbon fibers on the member and then it was examined whether or not the stable electric connection could be formed between the formed carbon fibers and the member.

As the result of earnest study, the present inventors found that as compared with the case of using a binary nitride material as the material of the member 5, in the case of using a ternary nitride material containing three components as the material of the member 5, there was a tendency for a catalytic material to be less diffused into the member 5 and for the member 5 to be less oxidized. As the result of the study of the members made of materials of various compositions, the present inventors found that a material capable of growing the carbon fibers 4 with a high degree of reproducibility and keeping excellent electrical connection between the member 5 and the carbon fibers 4 for a long time was a material including: (A) one kind of metal (a first element) selected from the group consisting of IVa group elements or Va group elements (hereinafter referred to as base material); (B) one kind of element (a second element) selected from the group consisting of C, Al, Si, Cr, and Zr (hereinafter referred to as "added material"); and (C) nitrogen.

More specifically, it is preferable that the material of the member 5 is a material expressed by: $Ti_xC_{1-x}N$ (x<1); $Ti_xAl_{1-x}N$ (x<1); $Ti_xSi_{1-x}N$ (x<1); $Ti_xCr_{1-x}N$ (x<1); $Ti_xZr_{1-x}N$ (x<1); $Zr_xC_{1-x}N$ (x<1); $Zr_xAl_{1-x}N$ (x<1); $Zr_xSi_{1-x}N$ (x<1); $Zr_xCr_{1-x}N$ (x<1); $Nb_xC_{1-x}N$ (x<1); $Nb_xAl_{1-x}N$ (x<1); $Nb_xSi_{1-x}N$ (x<1); $Nb_xCr_{1-x}N$ (x<1); $Nb_xZr_{1-x}N$ (x<1); $Ta_xC_{1-x}N$ (x<1); $Ta_xAl_{1-x}N$ (x<1); $Ta_xSi_{1-x}N$ (x<1); $Ta_xCr_{1-x}N$ (x<1); and $Ta_xZr_{1-x}N$ (x<1).

When a film is formed of these materials on a substrate by a reactive sputtering method, it is recommended that, for example, argon and a small amount of nitrogen be introduced into a vacuum chamber at the same time by the use of a target material such as $Ti_xC_{1-x}$ (x<1); $Ti_xAl_{1-x}$ (x<1); $Ti_xSi_{1-x}$ (x<1); $Ti_xCr_{1-x}$ (x<1); $Ti_xZr_{1-x}$ (x<1); $Zr_xC_{1-x}$ (x<1); $Zr_xAl_{1-x}$ (x<1); $Zr_xSi_{1-x}$ (x<1); $Zr_xCr_{1-x}$ (x<1); $Nb_xC_{1-x}$ (x<1); $Nb_xAl_{1-x}$ (x<1); $Nb_xSi_{1-x}$ (x<1); $Nb_xCr_{1-x}$ (x<1); $Nb_xZr_{1-x}$ (x<1); $Ta_xC_{1-x}$ (x<1); $Ta_xAl_{1-x}$ (x<1); $Ta_xSi_{1-x}$ (x<1); $Ta_xCr_{1-x}$ (x<1); and, $Ta_xZr_{1-x}$ (x<1) in a state where the temperature of the substrate is heated at approximately 300° C. With this, the above-mentioned material of the member 5 can be easily formed.

Moreover, even when a desired nitride target is used from the start, the above-mentioned material of the member 5 can be formed. Furthermore, in addition to the reactive sputtering method, it is also possible to use a method such as thermal CVD, PVD, or ion plating as a method for forming the above-mentioned material of the present invention.

Although not described here, more complex materials of quaternary or more material such as $Ti_xZr_yAl_zN$ (x+y+z=1) and $Ti_xZr_ySi_zN$ (x+y+z=1) can be appropriately used as the material of the member 5 of the present invention.

Moreover, the member 5 in the present invention may contain other elements in addition to the above-mentioned ternary nitride material or quaternary nitride material. Furthermore, the member 5 in the present invention may contain various compounds formed of the elements constituting the above-mentioned ternary nitride material or quaternary nitride material. For example, in the case of a member made of $Ti_xAl_{1-x}N$, the member may include not only ternary nitride material made of $Ti_xAl_{1-x}N$ but also binary nitride material made of TiN and AlN.

The reason why these materials produce the effect of preventing oxidization and diffusion is thought as follows.

Any one of Al, Si, Cr, and Zr is a material capable of forming both of nitride and oxide and hence can serve as a getter material for trapping oxygen atoms entering from the outside. Moreover, when the material is oxidized, its volume is expanded and the density of surface is increased to thereby cause oxygen atoms to be hard to enter. The formed oxide of Al, Si, Cr, or Zr is stable even at high temperature, and in the case of a simple substance of oxide, there is a tendency that the free energy of reaction associated with oxidization is large. Furthermore, among the above-mentioned added elements, Al or Si can produce a larger effect. It was recognized that when Al or Si producing a larger effect was added, it tended to precipitate as AlN or $Si_3N_4$ at grain boundaries of each of TiN, ZrN, NbN, and TaN, and served the function of preventing oxygen from diffusing through the grain boundaries. Therefore, it is thought that since AlN or $Si_3N_4$ can be formed at the crystalline boundaries of columnar crystals of the above-mentioned base material by a sputtering vapor deposition method, or the like, the formed AlN or $Si_3N_4$ can effectively prevent the oxygen atoms from diffusing through the crystal line boundaries of the base material.

Moreover, when the member made of the above-mentioned material is formed by the sputtering vapor deposition method, the concentration of oxygen atoms contained by a target (source of sputtering vapor deposition) has a large effect on the electric conductivity and oxidization resistance of the member 5. In the present invention, the concentration (atomic percent) of the oxygen atoms contained by the target is preferably 5,000 ppm or less and particularly preferably 3,000 ppm or less. However, the complete removal of the oxygen atoms, on the contrary, resulted in actively promoting diffusion and oxidization. For this reason, the concentration of oxygen contained in the target is preferably 10 ppm or more.

However, when carbon was used as a material added to the base material, it was recognized that carbon had an effect on diffusion. It is thought that this is caused by the fact that the oxide of carbon is gas. Since carbon is an interstitial element, carbon buries the defects of crystals. It is thought that because the sites of diffusion are occupied by carbon, atoms from the outside are hard to diffuse.

Moreover, as to specific resistance (volume resistivity) and thermal conductivity which are the important characteristics of an electrode used for various kinds of electronic devices such as an electron emitting device, a fuel battery, and a wiring circuit, the characteristics of the above-mentioned material will be described.

In terms of understanding the characteristics of the conductive material having been described here, the volume resistivities (specific resistances) of the base material and the added material are important parameters.

Hereinafter, the approximate volume resistivity (at room temperature) and thermal conductivity (at room temperature) of the base material are shown in Table 1.

TABLE 1

| Material | Volume Resistivity ($\mu\Omega$cm) | Thermal Conductivity (W/m · k) |
|---|---|---|
| TiN | 22 | 12 |
| ZrN | 20 | 28 |
| NbN | 200 | 16 |
| TaN | 130 | 6 |

The approximate volume resistivity (at room temperature) and thermal conductivity (at room temperature) of the added material are shown in Table 2.

TABLE 2

| Material | Volume Resistivity ($\mu\Omega$cm) | Thermal Conductivity (W/m · k) |
|---|---|---|
| $Si_3N_4$ | insulating material | 25 |
| AlN | insulating material | 170 |
| CrN | 150 | 11 |

As the result of examining some materials of the above-mentioned ternary nitride on the volume resistivity and thermal conductivity, the results shown in Table 3 were obtained.

TABLE 3

| Composition of Added Material | Ratio of Added Material (atm %) | Composition of Base Material | Ratio of Base Material (atm %) | Volume Resistivity ($\mu\Omega$cm) | Thermal Conductivity (W/m · k) |
|---|---|---|---|---|---|
| AlN | 27 | TiN | 73 | $8 \times 10^{-5}$ | 46 |
| AlN | 45 | TiN | 55 | $8 \times 10^{-3}$ | 100 |
| AlN | 80 | TiN | 20 | $8 \times 10^{-2}$ | 130 |
| AlN | 60 | ZrN | 40 | $5 \times 10^{-1}$ | 120 |
| $Si_3N_4$ | 65 | TiN | 35 | $1 \times 10^{-2}$ | 25 |
| $Si_3N_4$ | 80 | TiN | 20 | 1 | 40 |

As is evident from this Table 3, it was found that when the added material of insulating material was added to the base material, specific resistance increased, in particular, when the amount of added material was larger than 60%, specific resistance increased sharply exponentially.

In contrast to this, thermal conductivity increased gently according to the ratio of addition of a material having large thermal conductivity.

Therefore, a desirable conductive material can be achieved by combining, as appropriate, the above-mentioned characteristics relating to thermal conductivity, specific resistance, oxidation resistance, and diffusion resistance.

In particular, $Ti_xAl_{1-x}N$ (x<1) or $Zr_xAl_{1-x}N$ (x<1), in which a base material is TiN or ZrN and an added material is AlN and the ratio of Al to Ti or Zr is 30 atm % or less, is particularly preferable as a material having large thermal conductivity, excellent oxidization resistance, and excellent diffusion resistance. If the ratio of Al to Ti or Zr is within a range capable of producing the effect of the present invention, there is not the lower limit to the ratio of Al to Ti or Zr. However, the preferable lower limit that can be realistically applicable is 10 atm %. Similarly, nitride in which the ratio of an added material of Si to a base material of Ti or Zr ranges 10 atm % or more and 30 atm % or less is also preferable as the material of the member of the present invention.

Next, some combinations of the material of the member 5 and the state of oxidization of a catalytic material will be described.

The present inventors found that when the material of the member 5 is the above-mentioned ternary material and a material constituting the catalytic particles 6 is metal (for example, including Pd as a main component), carbon fibers can be grown from the catalytic material in the state of metal without using a process for oxidizing the catalytic material. For this reason, it became possible to use carbon fibers, which are made of a material vulnerable to an oxidizing process or a heating process, for a part of an electronic device and hence to offer a wide choice of manufacturing processes.

The present inventors found that when the material of the member 5 is a carbide nitride material or a ternary nitride material and a material constituting the catalytic particle 6 is in the state of oxide (for example, including palladium oxide as a main component), after the oxide catalyst is thermally reduced under a reduced pressure or is reduced by hydrogen, carbon fibers can be stably grown by the use of the catalyst.

Moreover, the member 5 of the present invention shown in FIG. 1A and FIG. 1B may be fixed to a substrate (not shown), and another member such as an electrode (not shown) may be interposed between the substrate (not shown) and the member 5.

The carbon fibers 4 placed on (or formed on) the member 5 may be carbon fibers that are vapor-deposited directly on the member 5 by decomposing the raw material gas of the carbon fiber by the use of a catalyst placed on the member 5. Various CVD methods such as a thermal CVD method and a plasma CVD method can be used as a vapor deposition method. Such a vapor deposition can be carried out also in the construction in which the member 5 is laminated on a substrate or an electrode.

Fe, Co, Ni, or Pd, or an alloy containing at least one element selected from these elements can be preferably used as the catalytic material. In particular, an alloy of Pd and Co can be preferably used in terms of forming graphite nano fibers. When the alloy of Pd and Co is used, carbon fibers having excellent electron emission characteristics can be produced at low temperature. In particular, when graphite nano fibers which will be described later are formed, it is preferable to use a catalyst containing Pd and Co. If the ratio of Co contained in the catalyst containing Pd and Co is not less than 5 atm % and not more than 80 atm %, carbon fibers having excellent electron emission characteristics can be produced with a high degree of reproducibility.

Moreover, gas containing carbon can be used as the raw material gas of the carbon fiber used for the vapor deposition.

Hydrocarbon gas such as acetylene, ethylene, methane, propane, and propylene can be preferably used as gas containing carbon used for the present invention. The vapor of organic solvent such as ethanol and acetone can be also used. Moreover, the mixed gas of the above-mentioned hydrocarbon gas and hydrogen gas can be more preferably used. When the mixed gas of the hydrocarbon gas and the hydrogen gas is used, the catalyst is reduced by the hydrogen gas contained in the mixed gas and hence carbon fibers can be well grown, which is preferable. In particular, by using mixed gas made by diluting the above-mentioned hydrocarbon gas by inert gas such as nitrogen gas or argon gas as the raw material gas of the carbon fibers, the carbon fibers can be manufactured by a simple apparatus having no special explosion-proof provision.

A specific example of a method for forming carbon fibers directly on the member 5 of the present invention by the use of such a vapor deposition method is, for example, the following method. First, for example, a conductive film (for example, Pt film) is formed on the whole surface of a substrate, and then a small area of member 5 (for example, $Ti_xC_{1-x}N$ (x<1)) of the present invention is formed on a part of the conductive film, and then the whole surface of the conductive film is covered with a catalyst (for example, palladium). Then, by bringing the raw material gas of carbon fiber into contact with the catalyst while heating this substrate, carbon fibers can be grown selectively and stably only on the member 5. Then, the electric connection between the formed carbon fibers and the conductive film made of Pt can be stably kept for a long time.

The carbon fiber 4 to be used in the present invention refers to a carbon fiber typically having a ratio of carbon of 50 atm % or more, more preferably a ratio of carbon of 70 atm % or more, and still more preferably a ratio of carbon of 90 atm % or more. When the carbon fibers are grown by the use of the catalyst (typically metal) by the method described above with reference to FIG. 2, in many cases, the carbon fibers include or support the catalyst material. For this reason, the carbon fiber of the present invention includes also a carbon fiber including the catalytic material therein and a carbon fiber supporting the catalytic material. Even in the case of the carbon fiber including such metal, the carbon fiber of the present invention refers to a carbon fiber having a ratio of carbon of 50 atm % or more, preferably a ratio of carbon of 70 atm % or more, and still more preferably a ratio of carbon of 90 atm % or more. Moreover, when the carbon fiber includes or supports a material different from carbon such as a catalytic material, it is preferable that the ratio of the included or supported material to carbon contained in the carbon fiber is effectively 20 mass % or less. Furthermore, more specifically, the "carbon fiber" in the present invention includes a conductive carbon fiber such as a carbon nanotube, a graphite nano fiber, or an amorphous carbon fiber. Among them, the graphite nano fiber is the most preferable in terms of electron emission characteristics.

Figure 13A:
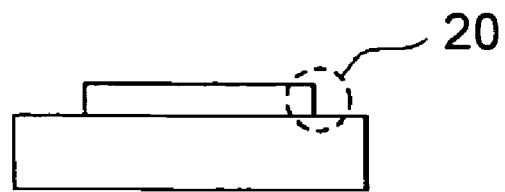
FIG. 13A to FIG. 13C are diagrams showing the structure of carbon nanotubes.
Figure 13B:
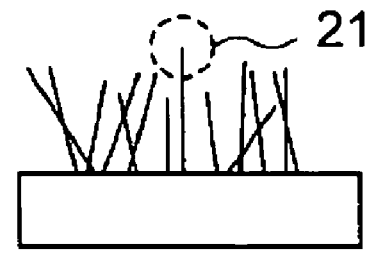
Figure 13C:
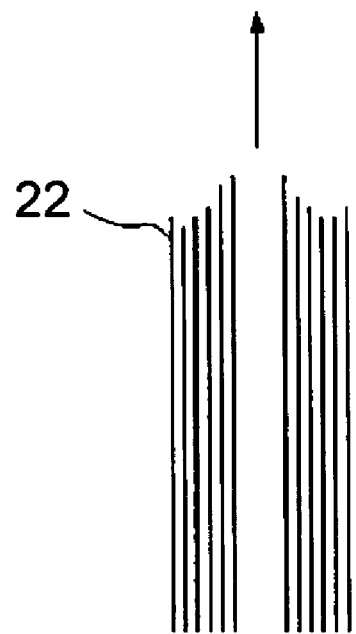
Figure 14A:
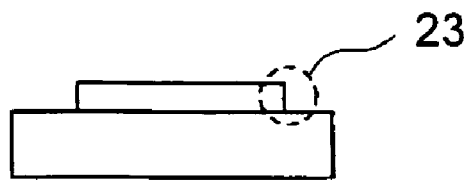
FIG. 14A to FIG. 14D are diagrams showing the structure of graphite nano fibers.
Figure 14B:
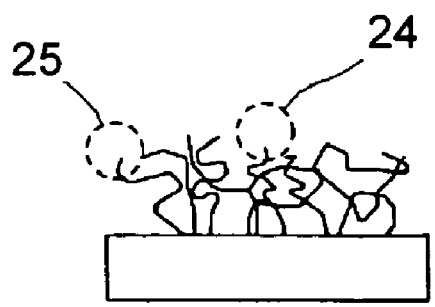
Figure 14C:
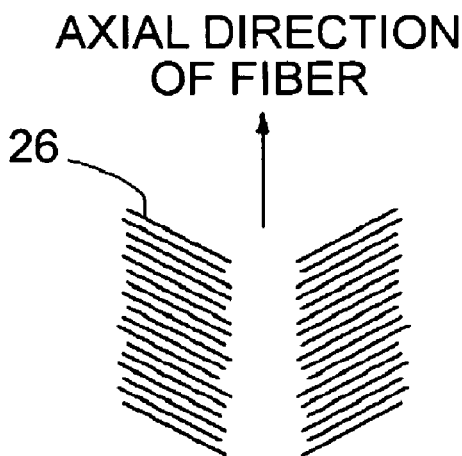
Figure 14D:
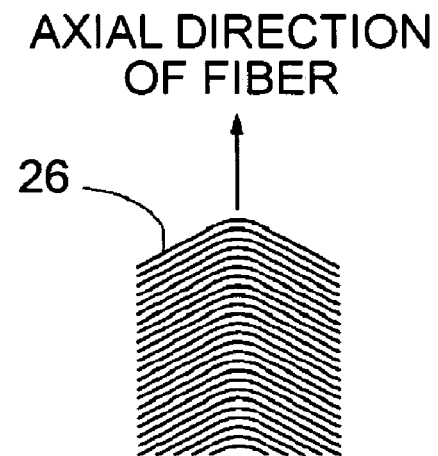

Examples of the form of the above-mentioned carbon fiber are shown in FIG. 13A to FIG. 13C and FIG. 14A to FIG. 14D. FIG. 13A and FIG. 14A show forms observed at the level of an optical microscope (up to 1000 times) FIG. 13B and FIG. 14B show forms observed at the level of a scanning electron microscope (SEM, up to 30,000 times), and FIG. 13B is a partial enlarged view of a portion 20 in FIG. 13A and FIG. 14B is a partial enlarged view of a portion 23 in FIG. 14A. FIG. 13C, FIG. 14C, and FIG. 14D schematically show forms of carbon fiber observed at the level of a transmission electron microscope (TEM, up to 1,000,000 times) and FIG. 13C is a partial enlarged view of a portion 21 in FIG. 13B, and FIG. 14C and FIG. 14D are partial enlarged views of portions 24, 25 in FIG. 14B. In the drawings, reference numerals 22, 26 denote graphenes.

As shown in FIG. 13C, a substance of graphene 22 of a cylindrical form is referred to as "a carbon nanotube". A substance comprised of many cylinders of graphenes 22, that is, of a multiple structure of cylindrical graphenes 22 is referred to as "a multi-wall carbon nanotube" and a substance comprised of one cylinder of graphene 22 is referred to as "a single wall carbon nanotube". In particular, in the case of a structure in which the tip of a nanotube is open, a threshold of electric field required to emit electrons is decreased to the lowest value. Moreover, there are substances each having a structure like the joint of a bamboo among the hollow structures of the multi-wall carbon nanotube and in the most of them, the angle of the graphene on the outermost periphery with respect to the axis of the fiber is nearly equal to 0° and the substances having this structure are also included in the carbon nanotube. It is characteristic of these carbon nanotubes that the axial direction of the fiber is parallel to the surface of the graphene formed on the outermost periphery formed in the cylindrical shape (that is, the angle formed by the axis of the fiber (direction of length of the fiber) and the graphene is approximately 0°) and that the tube is hollow.

As schematically shown in FIG. 14C and FIG. 14D, the fiber constructed of the graphenes 26 laminated (stacked) in such a way as to have an angle with respect to the axis of the fiber (that is, fiber in which a c axis is arranged in such a way as to have an angle with respect to the axis of the fiber) is referred to as "a graphite nano fiber". More specifically, the graphite nano fiber refers to a carbon fiber in which graphenes are laminated in the direction of length of the fiber (the axial direction or the direction of growth of the fiber), in other words, as shown in FIG. 14C and FIG. 14D, a carbon fiber in which the axis of the fiber and the surfaces of the laminated graphenes form an angle (the axis of the fiber and each of the laminated graphenes are not parallel). In contrast to this, the carbon nanotube is a carbon fiber in which graphenes are placed in such a way as to surround the direction of length of the fiber (axial direction of the fiber) (that is, in the cylindrical shape), in other words, a carbon fiber in which graphene (or a plurality of graphenes) is (or are) placed substantially in parallel to the axis of the fiber. In short, in the above-mentioned carbon nanotube, the c axis (a direction in which a plurality of graphenes are laminated, or a direction perpendicular to the surface of graphene) is substantially perpendicular to the axial direction of the fiber (direction of length of the fiber), whereas in the graphite nano fiber, the c axis (a direction in which a plurality of graphenes are laminated, or a direction perpendicular to the surface of graphene) is not perpendicular to the axial direction of the fiber (direction of length of the fiber) (that is, typically, parallel to the axial direction of the fiber).

A graphite nano fiber in which the angle formed by the axis of the fiber and the surface of the graphene is approximately 90° is referred to as "a platelet type". In other words, such a graphite nano fiber has a structure in which many graphenes are laminated like-many layers of cards. In contrast to this, as shown in FIG. 14C and FIG. 14D, a graphite nano fiber in which the angle of the surface of graphene 26 with respect to the axial direction of the fiber is smaller than 90° and larger than 0° is referred to as "a herringbone type". The herringbone type includes also a form in which bottom-less cup-shaped graphenes are laminated (stacked). Moreover, as shown in FIG. 14D, a form in which opened books are laminated (form in which graphenes shaped like a letter V are laminated) is also included in the "herringbone type".

There are a case where the central portion of the axis of the fiber of the herringbone type may be hollow and a case where the central portion may be filled with amorphous carbon in which (in the electron beam diffraction image at the level of TEM, a spot associated with a clear crystalline lattice or the light and dark image of a lattice cannot be observed but only a broad ring pattern can be barely observed).

In FIG. 14B is shown a schematic view when carbon fibers are grown in a state where they are not good in linearity. All of the fibers formed by the manufacturing method of the present invention are not good in linearity like this. The present invention includes also carbon fibers having excellent linearity as shown in FIG. 13B.

One sheet of graphite (or one carbon plane of stacked carbon planes) is referred to as "a graphene" or "a graphene sheet". More specifically, the graphite is a substance such that carbon planes are laminated (stacked) (ideally, laminated or stacked with a distance of 3.354 angstrom between the planes), wherein the carbon plane is such that regular hexagons, each of which is formed of carbon atoms covalently bonded to each other due to $sp^2$ hybridization, are arranged in such a way as to cover the whole plane. This one carbon plane is referred to as "a graphene" or "a graphene sheet".

Both of the carbon nanotube and the graphite nano fiber have a threshold of electron emission of from approximately 1 V/μm to 10 V/μm and can be preferably used as the electron emitting material of the present invention. In particular, the graphite nano fiber can produce an emission current larger than the carbon nanotube and hence is more preferable.

The carbon nanotube and the graphite nano fiber can be selectively manufactured by the kind of a catalyst and/or temperature for thermally decomposing the raw material gas of the carbon fiber. Therefore, even if the same catalyst is used, a carbon fiber of a desired structure can be selectively formed by selecting temperature for decomposing the raw material gas of the carbon fiber.

When an electron emitting device is formed by the use of the carbon fiber, one electron emitting device includes a plurality of carbon fibers. It is more preferable that the graphite nano fiber is used as the carbon fiber for the electron emitting material. This is because an electron emitting device formed by using a plurality of graphite nano fibers as the electron emission material can secure a larger electron emission current density than an electron emitting device formed by using the carbon nanotubes.

The graphite nano fiber has fine bumps and dips on the surface (side surface of the fiber) as shown in FIG. 14C or FIG. 14D, which is different from the carbon nanotube. For this reason, it is thought that the graphite nano fiber easily develops electric field concentration and hence easily emits electrons. Moreover, the graphite nano fiber has a form in which graphenes extended from the central axis of a fiber to the outer periphery (surface) of the fiber and hence is thought to easily emit electrons.

In contrast to this, the side surface of the carbon nanotube fundamentally corresponds to the c face of graphite. For this reason, the side surface of the carbon nanotube is chemically inactive and does not have such fine bumps and dips that are formed on the graphite nano fiber, so that the carbon nanotube is thought to be hard to emit electrons relative to the graphite nano fiber.

An electron emitting device formed by using the graphite nano fibers can secure a sufficiently large amount of emission of electrons even if the fibers are bent. Therefore, the electron emitting device formed by using the graphite nano fibers is more preferable than the electron emitting device formed by using the carbon nanotubes.

The above-mentioned electron emitting device formed by using the carbon fibers placed on the member 5 of the present invention will be described in detail by providing the preferred embodiments.

The electron emitting device of the present invention includes the above-mentioned member and carbon fibers fixed to the member. To emit electrons stably, it is preferable that a plurality of carbon fibers are fixed to the member. In the following embodiments, there will be described a case where the electron emitting device further includes a control electrode provided for the purpose of drawing out electrons from the carbon fibers or controlling electrons emitted from the carbon fibers and a cathode electrode placed on the assumption that the conductivity of the member is low. Needless to say, the electron emitting device of the present invention includes also a construction that does not use the control electrode and/or the cathode electrode.

Figure 3A:
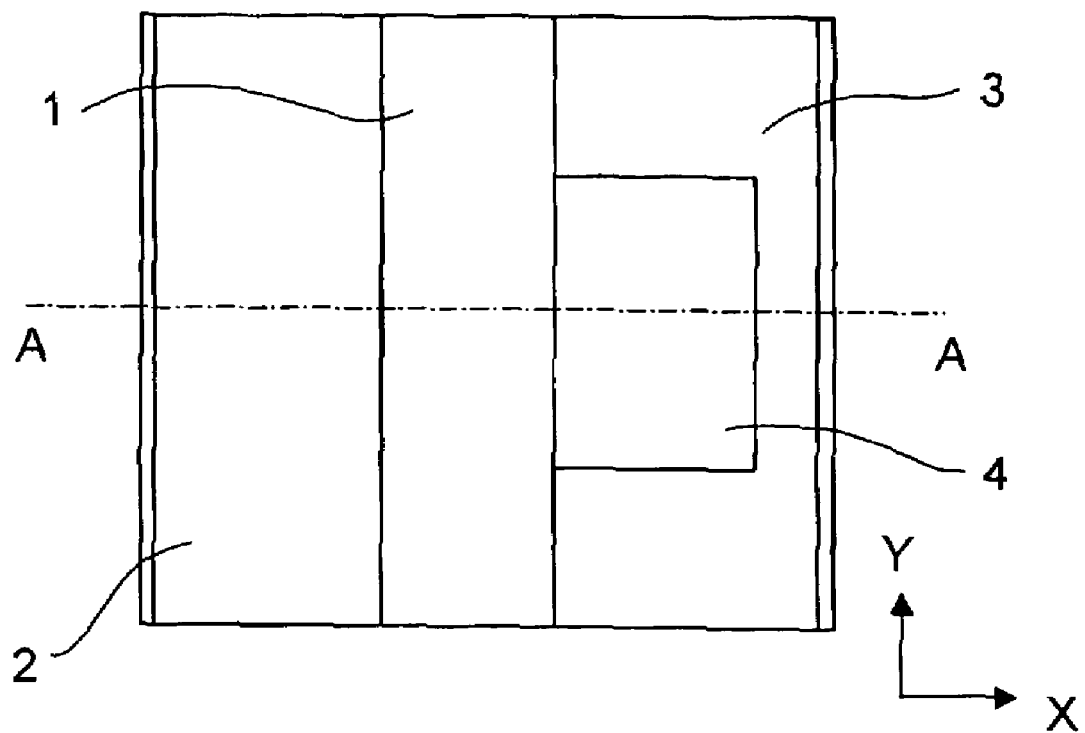
FIG. 3A is a view, when viewed from above, of an electron emitting device according to an example 1 of the present invention
Figure 3B:
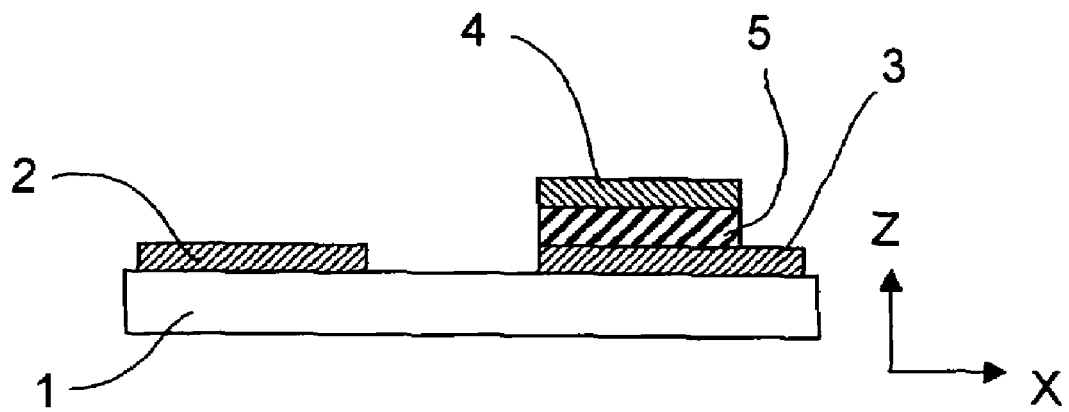
FIG. 3B is a sectional view taken on a line A-A in FIG. 3A.

FIG. 3A is a schematic view showing one example of the construction of an electron emitting device of the present invention and FIG. 3B is a sectional view taken on a line A-A in FIG. 3A. In FIG. 3A and FIG. 3B, a reference numeral 1 denotes an insulating substrate, 2 denotes a control electrode (gate electrode) as a second electrode, 3 denotes a cathode electrode as a first electrode, 4 denotes a plurality of carbon fibers, and 5 denotes a member having a plurality of carbon fibers placed thereon and formed of the above-mentioned material. Although an example having the member 5 placed on the electrode 3 is shown in the above-mentioned embodiment and examples to be described below, when the member 5 has sufficient conductivity, the member 5 itself can be also used as the first electrode without using the electrode 3. In this case, the member 5 functions as the cathode electrode.

Figure 17:
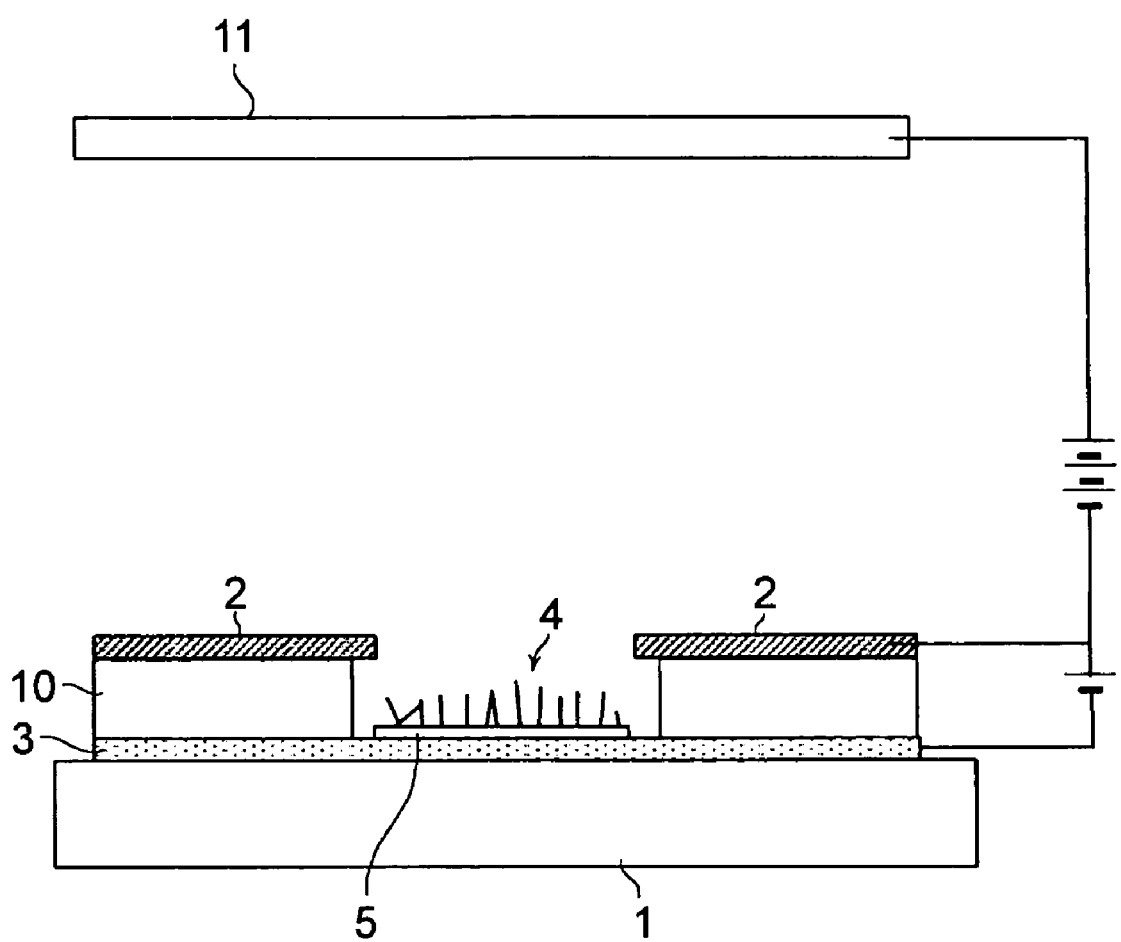
FIG. 17 is a diagram showing an example of the construction of a longitudinal electron emitting device.

In the example shown in FIG. 3A and FIG. 3B, there is shown a case in which the electrode 3 and the control electrode 2 are placed separately from each other on the surface of the same substrate, that is, a so-called lateral type electron emitting device. However, the present invention can be also used for a so-called vertical type electron emitting device as shown in FIG. 17. In FIG. 17, a reference numeral 1 denotes a insulating substrate, 3 denotes the cathode electrode, 2 denotes the control electrode (which is also used as a gate electrode in some cases), 4 denotes the carbon fiber, 5 denotes the member, 10 denotes an insulating layer, and 11 denotes an anode electrode.

Figure 8:
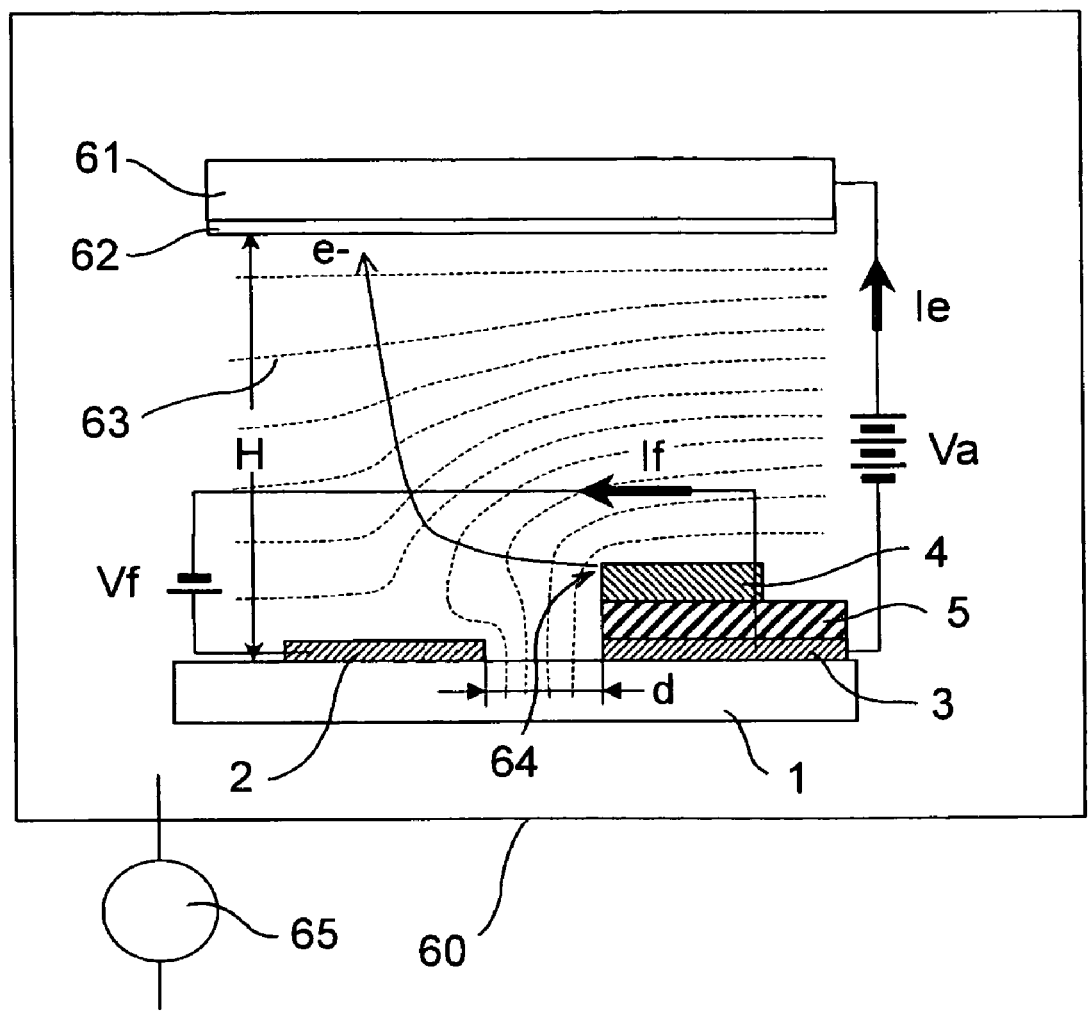
FIG. 8 is a diagram showing an example of the construction of an electron emitting device for activating an electron emitting device.

For example, as shown in FIG. 8, by providing an anode electrode 61 above the above-mentioned electron emitting device arranged in a vacuum chamber 60, it is possible to construct an electron emitting device that traps electrons emitted from the carbon fiber 4 by the anode electrode 61. Here, in FIG. 8, a reference numeral 1 denotes the substrate, 2 denotes the control electrode such as a gate electrode, 3 denotes the cathode electrode, 4 denotes the plurality of carbon fibers, 5 denotes the member, 60 denotes a vacuum chamber, 61 denotes an anode electrode, 62 denotes a light emitting body that is irradiated with an electron beam to thereby emit light, 63 denotes an equipotential line formed between the substrate 1 and the anode electrode 61, 64 denotes a portion to which the highest electric field intensity is applied of the plurality of carbon fibers 4, and 65 denotes an exhaust unit. The distance d between the electrode 3 and the control electrode 2 is preferably set at a value of from 1 μm to 100 μm inclusive. The distance H between the substrate 1 and the anode electrode 61 is preferably set at a value of 500 μm or more and 20 mm or less, and more preferably set at a value of 1 mm or more and 5 mm or less. A voltage of 1 kV or more and 30 kV or less, more preferably, 10 kV or more and 25 kV or less is applied to the anode electrode 61. The inside of the vacuum chamber 60 is preferably kept under vacuum of $10^{-4}$ Pa or less. An electron emitting device like this is an electron emitting device of a three-terminal structure (triode structure). When a light emitting body 62 that is irradiated with electrons to thereby emit light is provided on the surface of the anode electrode 61, the light emitting body 62 can form a light emitting device such as a lamp. Then, when many light emitting devices like this are placed, they can form an image display device such as a display to be described later. When the control electrode 2 was removed from the construction shown in FIG. 8, an electron emitting device of a two-terminal structure (diode structure) can be formed. In the electron emitting device of a two-terminal structure (diode structure), when a voltage is applied between the electrode 3 (member 5) and the anode electrode 61, electrons can be emitted from the carbon fibers 4.

When the control electrode 2 shown in FIG. 8 is used as a gate electrode for emitting electrons from the carbon fibers 4, it is thought that the electrons are emitted predominantly from the tips (portions shown by a reference numeral 64 in FIG. 8) of the carbon fibers 4 placed at positions closer to the control electrode 2 of the plurality of carbon fibers 4.

As the above-mentioned insulating substrate 1 can be used quartz glass whose surface is sufficiently cleaned; glass which is reduced in the content of impurities such as Na and in which K substitutes for a part of the impurities; a laminated body having silicon oxide (typically $SiO_2$) laminated on a soda-lime glass plate, a silicon substrate, or the like by a sputtering method or the like; or ceramics of alumina or the like.

The above-mentioned control electrode 2 and electrode 3 have conductivity and can be formed by a common vacuum film forming technology such as a vapor deposition method and a sputtering method and by a photolithography technology. It is essential only that the materials of the electrodes 2, 3 are conductive materials. The materials of the electrodes 2, 3 can be selected as appropriate, for example, from metal, metal carbide nitride, metal carbide, metal boride, semiconductor, and metallic compound of semiconductor. The thickness of the above-mentioned electrode (cathode electrode) 3 is set within a range from several tens nm to several tens μm. Preferably, the material of the above-mentioned electrode 3 is a heat resistant material such as carbon, metal, metal carbide nitride, and metal carbide. When the electrode 3 is used in addition to the member 5, the resistance of the electrode 3 is made smaller than the resistance of the member 5.

It is essential only that the distance between the control electrode 2 and the electrode 3 (member 5) is determined in relation to a driving voltage applied between the control electrode 2 and the electrode 3 in such a way that lateral electric field is 10 to 50 times larger than vertical electric field in the comparison of the lateral electric field and the vertical electric field applied to the carbon fibers. In the case of an electron emitting device or an image display device in which the light emitting body 62 is placed on the anode electrode 61 as shown in FIG. 8, preferably, the vertical electric field is within a range from $10^{-1}$ V/μm to 10 V/μm. For example, in the case where the distance between the anode electrode 61 and the electrode 3 (or the distance H between the anode electrode 61 and the substrate 1) is set at 2 mm and a voltage of 10 kV is applied between the anode electrode 61 and the electrode 3, the vertical electric field becomes 5 V/μm. In this manner, typically, the vertical electric field is regarded as the electric field between the electrode 3 (member 5) having the carbon fibers placed thereon and the anode electrode 61. Therefore, typically, the value of the vertical electric field is a value obtained by dividing the voltage between the anode electrode 61 and the electrode 3 by the distance between the anode electrode 61 and the electrode 3. Moreover, typically, the lateral electric field is regarded as the electric field between the electrode 3 and the control electrode (drawing-out electrode) 2. Therefore, typically, the value of the lateral electric field is a value obtained by dividing the voltage between the electrode 3 and the control electrode 2 by the distance d between the electrode 3 and the control electrode 2.

Figure 9:
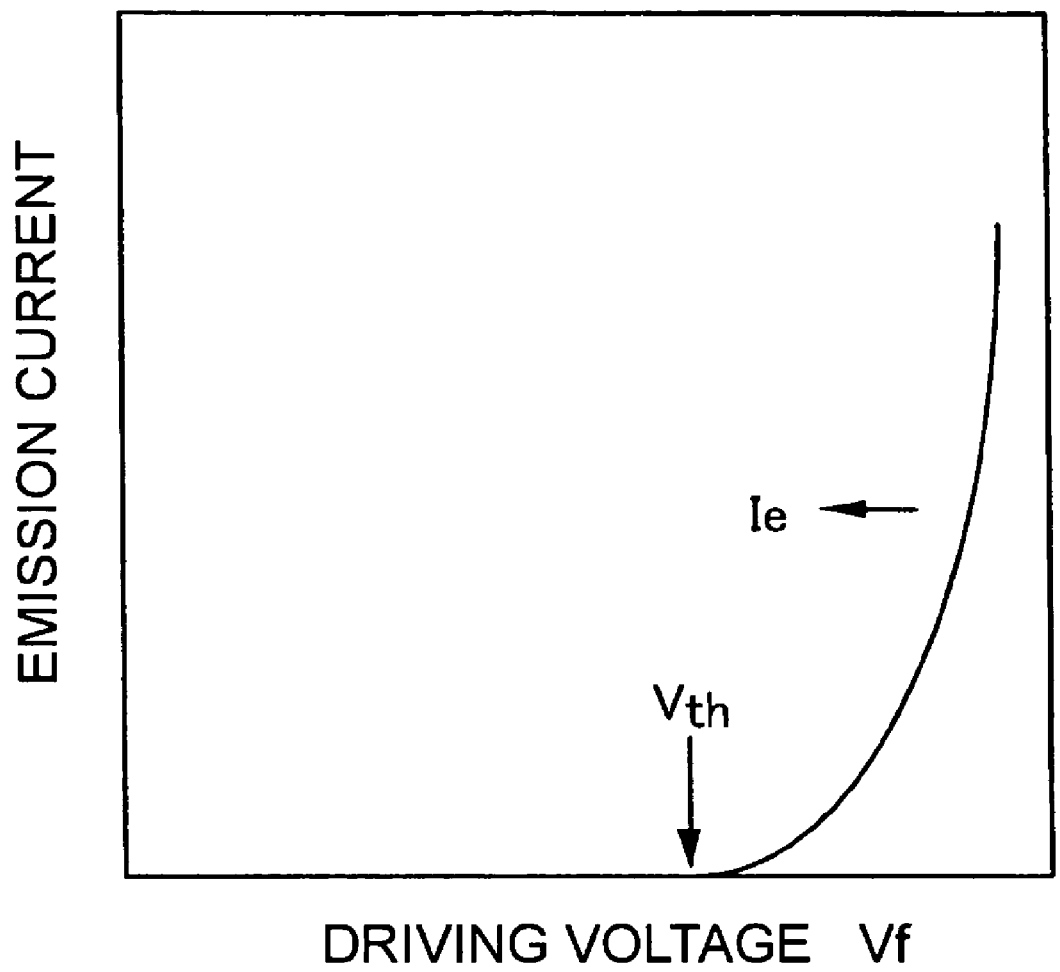
FIG. 9 is an example of the operating characteristic of an electron emitting device.

In the above-mentioned electron emitting device described, when a device current If flowing between the electrode 3 and the control electrode 2 and an emission current Ie are measured in a state where a pulse voltage of a driving voltage Vf (from 10 V or more to 100 V or less) is applied between the electrode 3 and the control electrode 2, characteristic shown in FIG. 9 can be obtained. That is, the emission current Ie rapidly rises up from a voltage of approximately one half of the driving voltage Vf. Moreover, the characteristic of the device current If (not shown) is similar to the characteristic of the emission current Ie but its value is sufficiently smaller than the emission current Ie. Such electron emission characteristic is the same as that of the longitudinal electron emitting device shown in FIG. 17.

An electron source produced by arranging a plurality of electron emitting devices will be described on the basis of this electron emission characteristic by the use of FIG. 10.

Figure 10:
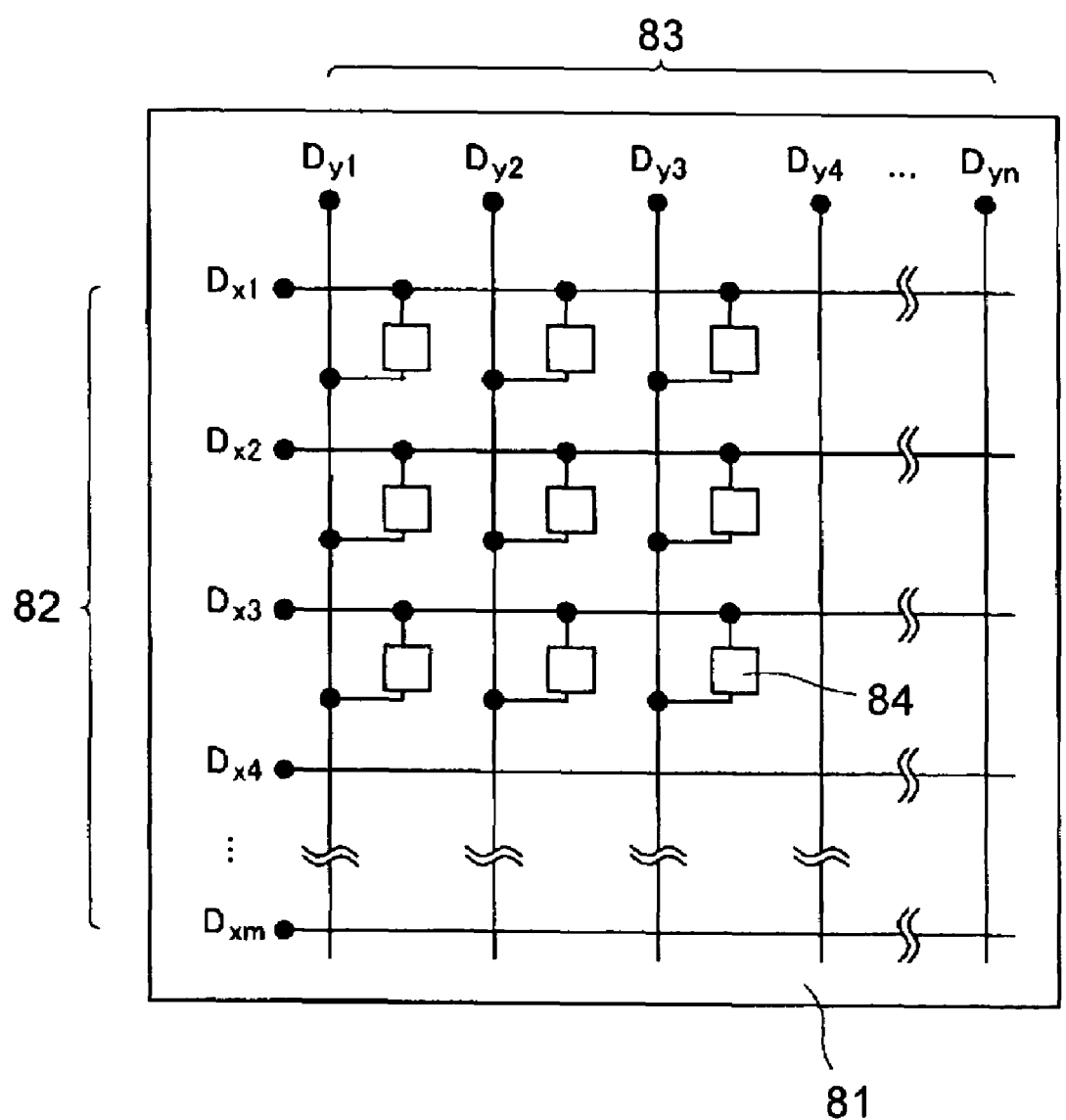
FIG. 10 is diagram showing an example of the construction of an electron source constructed of a plurality of electron emitting devices.

In FIG. 10, a reference numeral 81 denotes an electron source substrate, 82 denotes wirings in the X direction (Dx1 to Dxm), 83 denotes wirings in the Y direction (Dy1 to Dyn), and 84 denotes the above-mentioned electron emitting device of the present invention. Here, both of n and m are positive integers.

The m wirings 82 in the X direction are comprised of Dx1, Dx2, . . . , and Dxm and can be constructed of a metal film or the like formed by the use of a vacuum vapor deposition method, a printing method, a sputtering method, or the like. The material, film thickness, film width of the wiring can be designed as appropriate. The n wirings 83 in the Y direction are comprised of Dy1, Dy2, . . . , and Dyn and can be formed in the same manner as the wirings 82 in the X direction. Between the m wirings 82 in the X direction and the n wirings 83 in the Y direction, there is provided an interlayer insulating layer (not shown) for electrically separating both of the wirings 82, 83.

The interlayer insulating layer is constructed of $SiO_2$ or the like formed by the use of the vacuum vapor deposition method, the printing method, the sputtering method, or the like. For example, the interlayer insulating layer is formed in a desired shape on the whole or a portion of the electron source substrate 81 having the wirings 82 in the X direction formed thereon and, in particular, the film thickness, material, and manufacturing method of the interlayer insulating layer are set as appropriate in such a way as to endure the electric potential differences at the intersections of the wirings 82 in the X direction and the wirings 83 in the Y direction. The respective end portions of the wirings 82 in the X direction and the wirings 83 in the Y direction are drawn out as external terminals.

A pair of electrodes such as the cathode electrode 3 and control electrode 2 (described above) of the electron emitting device 84 are electrically connected to the wiring 82 in the X direction and the wiring 83 in the Y direction. In a material constituting the wirings 82 in the X direction and the wirings 83 in the Y direction and a material constituting the pair of element electrodes, a part of or the whole of constituent elements of the materials may be identical to each other or may be different from each other.

A scanning signal applying unit (not shown) for applying a scanning signal for selecting the row of the electron emitting devices 84 arranged in the X direction is connected to the wirings 82 in the X direction, whereas a modulation signal generating unit (not shown) for modulating, in synchronization with the scanning signal, the amount of emission of electrons from each row of the electron emitting devices 84 arranged in the Y direction is connected to the wirings 83 in the Y direction. A driving voltage applied to each electron emitting device 84 is supplied as the difference voltage between the scanning signal and the modulation signal applied to the element 84.

In the above-mentioned construction, it is possible to select individual devices and to drive them independently.

An image display panel constructed by the use of the electron source having the electron emitting devices arranged in a matrix like this will be described with reference to FIG. 11. FIG. 11 is a schematic view showing one example of an image display panel (an air tight vessel or an air tight container). In FIG. 11, a reference numeral 81 denotes the electron source substrate (in some cases, also referred to as a "rear plate") having a plurality of electron emitting devices 84 arranged thereon, and 96 denotes a face plate having a fluorescent film (cathodoluminescent film) 94, a metal back 95, and the like formed on the internal surface of a glass substrate 93. A reference numeral 92 denotes a supporting frame, and the rear plate 81 and the face plate 96 are connected to the supporting frame 92 by the use of an adhesive such as frit glass or indium. When the frit glass is used as the adhesive, the externally enclosed unit (vessel or container) 97 is baked, for example, in the atmosphere, in a vacuum, or in a nitrogen gas within a temperature range from 400° C. to 500° C. for 10 minutes or more, thereby being sealed and constructed. Moreover, by interposing a supporting part (not shown) called a spacer between the face plate 96 and the rear plate 81, it is also possible to construct the externally enclosed unit 97 having sufficient strength to the atmospheric pressure.

Moreover, it is also possible to construct an information display reproduction apparatus by the use of the an image display panel (an air tight vessel or an air tight container) 97 of the present invention described by the use of FIG. 11.

Specifically, the information display reproduction apparatus is comprised of a receiver for receiving a broadcasting signal such as television broadcasting, a tuner for selecting a received signal, and the image display panel 97, and outputs at least one of image information, character information, and sound information that are included in the selected signal to the image display panel 97 to display and/or reproduce the information. With this construction, the information display reproduction apparatus such as a television can be constructed. Of course, when the broadcasting signal is encoded, the information display reproduction apparatus of the present invention can include also a decoder. Moreover, the sound signal is outputted to a sound reproducing device such as a speaker provided separately, thereby being reproduced in synchronization with image information and character information displayed on the image display panel 97.

Moreover, a method for outputting image information or character information to the display panel 97 to display and/or reproduce the same can be performed, for example, in the following manner. First, image signals corresponding to the respective pixels of the image display panel 97 are produced from the received image information and character information. Then, the produced image signals are inputted to the drive circuit of the image display panel 97. Then, voltages to be applied to the respective electron emitting devices in the image display panel 97 from the drive circuit are controlled on the basis of the image signals inputted to the drive circuit to thereby display an image.

FIG. 12 is a block diagram of a television apparatus according to the present invention. A receiving circuit 70 is comprised of a tuner, a decoder, and the like, and receives and decodes television signals of satellite broadcasting, terrestrial waves, data broadcasting via a network, and the like and outputs the decoded image data to an I/F unit 71. The I/F unit 71 converts the image data into the display format of an image display device 72 and outputs the converted image data to the image display device 72. The image display device 72 includes the image display panel 97, a control circuit 73 and a drive circuit 74. The control circuit 73 subjects the inputted image data to image processing such as correction processing suitable for the image display panel 97 and outputs the image data and various control signals to the drive circuit 74. The drive circuit 74 outputs a driving signal to each of the wirings (wirings of from Dx1 to Dxm in the X direction and wirings of from Dy1 to Dyn in the Y direction shown in FIG. 10 and FIG. 11) of the image display panel 97 on the basis of the inputted image data. With this, a television image can be displayed. The receiving circuit 70 and the I/F unit 71 may be housed as a set-top box (STB) in a box separate from the image display device 72 or may be housed in the same box as the image display device 72.

The construction of the image display device 72 described here is one example of an image display device to which the present invention can be applied and can be variously modified on the basis of the technical idea of the present invention. Moreover, the image display device of the present invention can be used as a display device and the like of a video conference system, a computer, and the like.

Hereinafter, the examples of the present invention will be described in detail.

EXAMPLE 1

In FIG. 3A is shown a view, when viewed from above, of an electron emitting device manufactured according to the present example and FIG. 3B is a sectional view taken on a line A-A in FIG. 3A.

In FIG. 3A and FIG. 3B, a reference numeral 1 denotes the insulating substrate, 2 denotes the control electrode (also referred to as a drawing-out electrode, or a gate electrode), 3 denotes the electrode (referred to as a cathode electrode), 4 denotes the plurality of carbon fibers, 5 denotes the conductive member made of a member material of the present invention.

The manufacturing process of the electron emitting device of the present example will be described by the use of FIG. 7.

(Step 1: Refer to FIG. 7A)

A quartz substrate was used as a substrate 1. The substrate 1 was sufficiently cleaned and then Ti and Pt were vapor-deposited continuously in layer thicknesses of 5 nm (not shown) and 30 nm, respectively, on the substrate 1 by a sputtering method. Next, a resist pattern was formed by the use of a positive photoresist in a photolithography step. Next, the Pt layer and the Ti layer were dry-etched by an Ar gas by using the above-mentioned patterned photoresist as a mask to thereby form the control electrode 2 and the electrode 3. The distance between the control electrode 2 and the electrode 3 was set at 5 μm.

(Step 2: Refer to FIG. 7B)

A sputtering unit was sufficiently evacuated and then a substrate temperature was set at from 25° C. to 300° C. An Argon gas was mixed with a nitrogen gas and the pressure of the mixed gas was keep on the order of from 0.4 Pa to 10 Pa. $Ti_xAl_{(1-x)}N$ was vapor-deposited in a thickness of 300 nm by the use of a target of $Ti_7Al_3$ having an atomic percent of Al of 30% or less by a reactive sputtering method (using a mixed gas of $Ar+N_2$) to thereby form a $Ti_xAl_{(1-x)}N$ layer 50.

(Step 3: Refer to FIG. 7C)

Next, the substrate was cooled to room temperature and then Pb—Co only of the order of an amount forming an island was vapor-deposited by the use of the same vacuum unit used in step 2 by the sputtering method using an Ar gas. At this step, fine particles 6 each having a particle diameter of from approximately 3 nm to 10 nm were formed on the surface of the $Ti_xAl_{(1-x)}N$ layer 50. The density of the particles 6 at this time was estimated to be from $10^{11}$ particles/cm$^2$ to $10^{12}$ particles/cm$^2$.

(Step 4: Refer to FIG. 7D)

Next, in a photolithography step, a resist pattern was formed by the use of a positive photoresist. The island-shaped Pd—Co layer (catalytic particles 6) and the $Ti_xAl_{(1-x)}N$ layer 50 were dry-etched by a mixed gas of $CF_4$ and a trace amount of oxygen by using the patterned photoresist as a mask to thereby form the member 5 and the Pd—Co catalytic particles 6 only on one electrode (electrode 3).

(Step 5: Refer to FIG. 7E)

Next, the substrate was heated in a 0.1% ethylene gas flow diluted with nitrogen at atmospheric pressure at 500° C. for 10 minutes. Observations of this by a scanning electron microscope revealed that many carbon fibers 4 each having a diameter of from approximately 5 nm to 25 nm and bending and extending in the shape of a fiber were formed in the area where Pd—Co was applied. At this time, the thickness of layer of the carbon fiber 4 became approximately 1,000 nm.

The present device was put in the vacuum chamber 60 shown in FIG. 8 and the vacuum chamber 60 was sufficiently evacuated by the exhaust unit 65 until the degree of a vacuum reached $2 \times 10^{-5}$ Pa. Then, as shown in FIG. 8, a positive (anode) voltage Va=10 kV was applied to the positive (anode) electrode 61 placed a distance H=2 mm away from the device. At this time, a pulse voltage of a driving voltage Vf=20 V was applied to the device and a flowing device current If and an emission current Ie were measured.

The If–Ie characteristic of the device was the characteristic shown in FIG. 9. That is, the emission current Ie rapidly increased from a voltage of approximately half of the applied voltage (driving voltage Vf) and the emission current Ie of approximately 1 μA was measured at a driving voltage of 15 V. In contrast to this, the characteristic of the device current If was similar to that of the emission current Ie, but the device current If was smaller than the emission current Ie by one figure or more.

In the present example, the carbon fibers 4 could be grown at a desired density by placing the member 5 on the electrode 3. Moreover, by using the member 5 as the electric connection layer of the carbon fibers 4, electrons could be stably emitted even when the carbon fibers 4 were placed on the electrode 3.

An analysis of the member 5 ($Ti_xAl_{(1-x)}N$ (x<1)) formed by the present method showed that the ratio of Ti to Al was 7:3 which was approximately equal to that of the target.

Moreover, as the result of carrying out Raman spectral observations of the carbon fibers 4 and the comparison of the carbon fibers formed by using the $Ti_xAl_{(1-x)}N$ layer with the carbon fibers formed by using a TiN conductive layer by the use of the absolutely same catalyst, it was found that the carbon fibers formed by using the $Ti_xAl_{(1-x)}N$ layer was clearly higher in the peak of a G band and sharper in half band width than the carbon fibers formed by the TiN conductive layer.

To examine this phenomenon, a catalytic material was laminated on the conductive layer and then was kept at an appropriate temperature to thereby form a substrate. Observations of the diffusion profile of the catalytic material into the conductive layer were carried out by the use of glow discharge spectrometry (GDS) at the time of sputtering Ar.

As a result, a peak of Co was clearly observed in the TiN layer. However, in the $Ti_xAl_{(1-x)}N$ layer, the peak of Co was observed to be smaller or to be only slightly spread to an interface, which revealed that the amount of diffusion of Co clearly decreased.

Observations of the carbon fibers 4 of this element by a transmission electron microscope revealed that the carbon fiber 4 had a structure in which graphenes were laminated as shown in FIG. 14D. The distance (in the direction of C axis) between the layers of laminated graphenes was not clear at a low temperature of approximately 500° C. and was 0.37 nm.

EXAMPLE 2

Figure 4A:
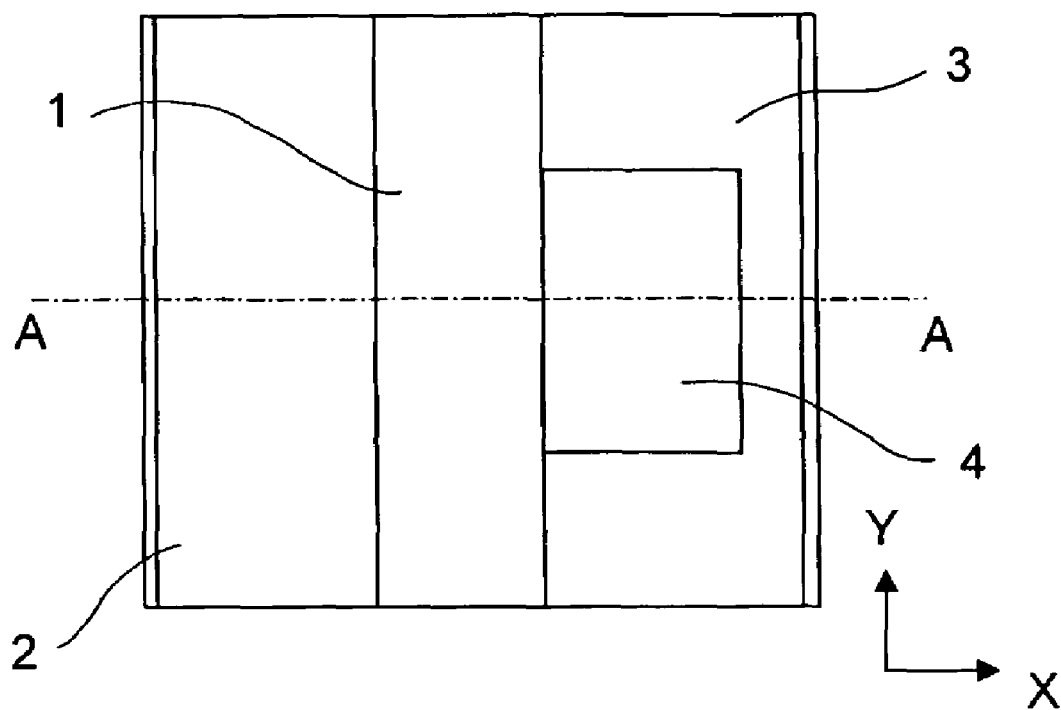
FIG. 4A is a view, when viewed from above, of an electron emitting device according to an example 2 of the present invention
Figure 4B:
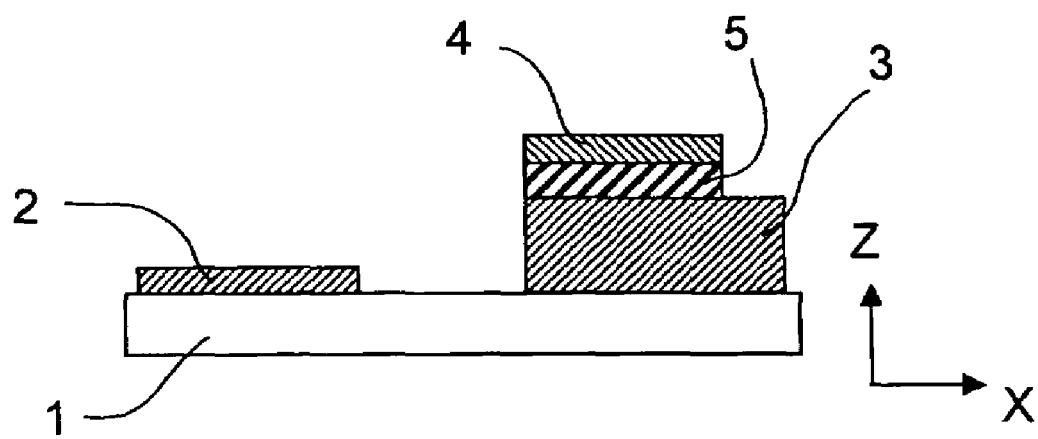
FIG. 4B is a sectional view taken on a line A-A in FIG. 4A.

The construction of an electron emitting device according to an example 2 of the present invention is shown in FIG. 4A and FIG. 4B. Hereinafter, the differences in the manufacturing method between the example 1 and the example 2 will be described.

In the present example, in the step 1, the electrode 3 was formed in a thickness of 500 nm and the control electrode 2 was formed in a thickness of 30 nm. Moreover, in the step 2, $Zr_7Al_3$ was used as a target for sputtering. An analysis of the member 5 ($Zr_xAl_{(1-x)}N$ (x<1)) formed by the present method showed that the ratio of Zr to Al was 7:3 which was approximately equal to that of the target. Moreover, in the step 3 was used a catalyst produced by adding approximately 20 atm % Co to metal Pd.

Even in the member 5 ($Zr_xAl_{(1-x)}N$ (x<1)) of the present example, a sheet resistance did not vary before and after the growth of the carbon fibers 4, which showed that a contact layer was stably formed. Moreover, the carbon fibers 4 could be stably grown by the alloyed catalyst.

EXAMPLE 3

Figure 5A:
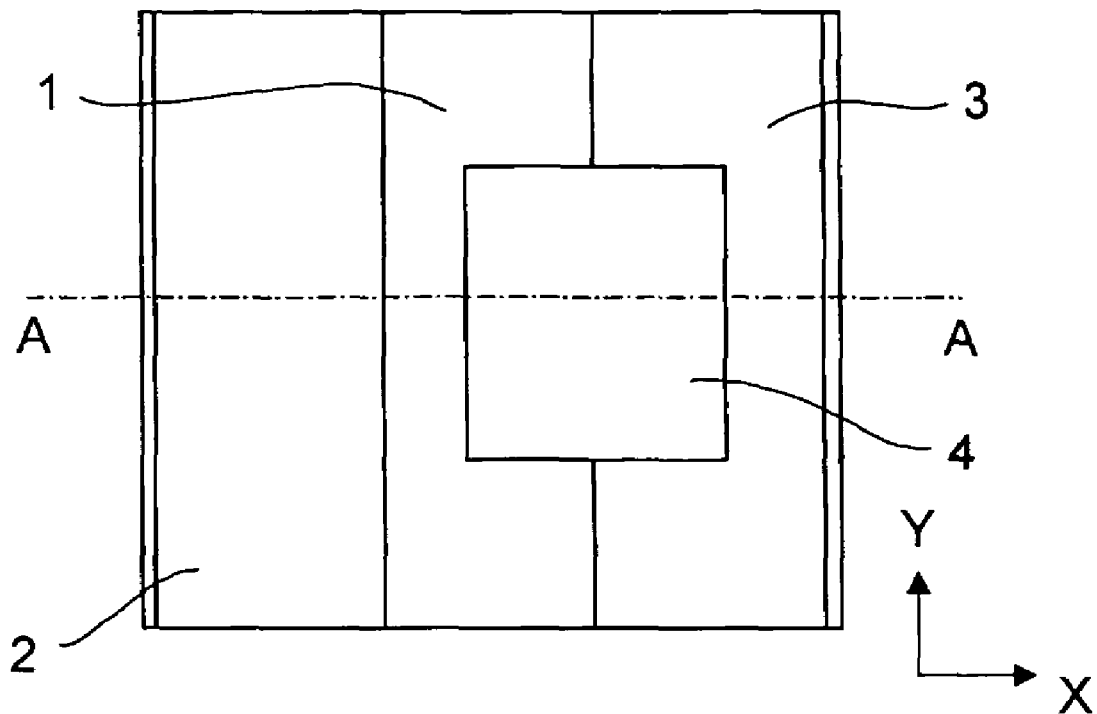
FIG. 5A is a view, when viewed from above, of an electron emitting device according to an example 3 of the present invention
Figure 5B:
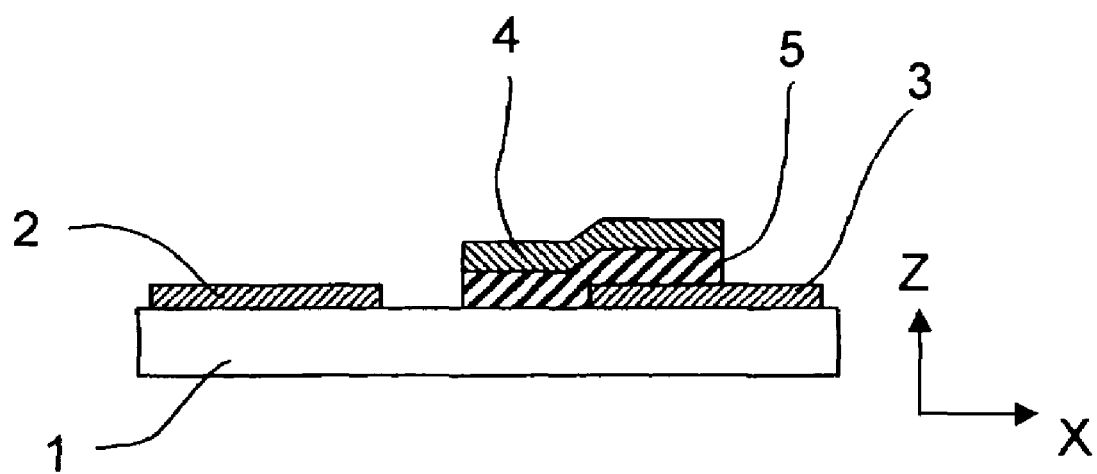
FIG. 5B is a sectional view taken on a line A-A in FIG. 5A.

The construction of an electron emitting device according to an example 3 of the present invention is shown in FIG. 5A and FIG. 5B. Hereinafter, the differences in the manufacturing method between the example 1 and the example 3 will be described.

In the present example, in the step 4, the member 5 and the metallic catalyst particles 6 were formed across the electrode 3 and the gap between the electrode 3 and the control electrode 2. The member 5 was formed nearly to a middle position (approximately half of the gap) between the electrode 3 and the control electrode 2. Moreover, in the present example, in the step 2, a target made of NbC (niobium carbide) was used as a target. An analysis of the member 5 ($Nb_xC_{(1-x)}N$ (x<1)) formed by the present method showed that the ratio of Nb to C was 1:1 which was approximately equal to that of the target. Moreover, in the step 3, a catalyst produced by adding approximately 10 atm % Fe to metal Pd was used. Furthermore, in the step 5, 0.1% acetylene diluted with nitrogen was used as a gas for growing the carbon fibers.

Even in the member 5 ($Nb_xC_{(1-x)}N$) of the present example, a sheet resistance did not vary before and after the growth of the carbon fibers 4, which revealed that a contact layer was stably formed. Moreover, the carbon fibers 4 could be stably grown by the alloyed catalyst.

When the element of the present example is compared with that of the example 1, the distance between the control electrode 2 and the member 5 and the carbon fibers 4 is smaller and hence electric field is stronger by approximately 2 times. For this reason, the driving voltage could be reduced to approximately 8 V. Moreover, since the member 5 was used as the electric connection layer of the carbon fibers, electrons could be stably emitted from the carbon fibers in the gap between the control electrode 2 and the electrode 3.

EXAMPLE 4

Figure 6A:
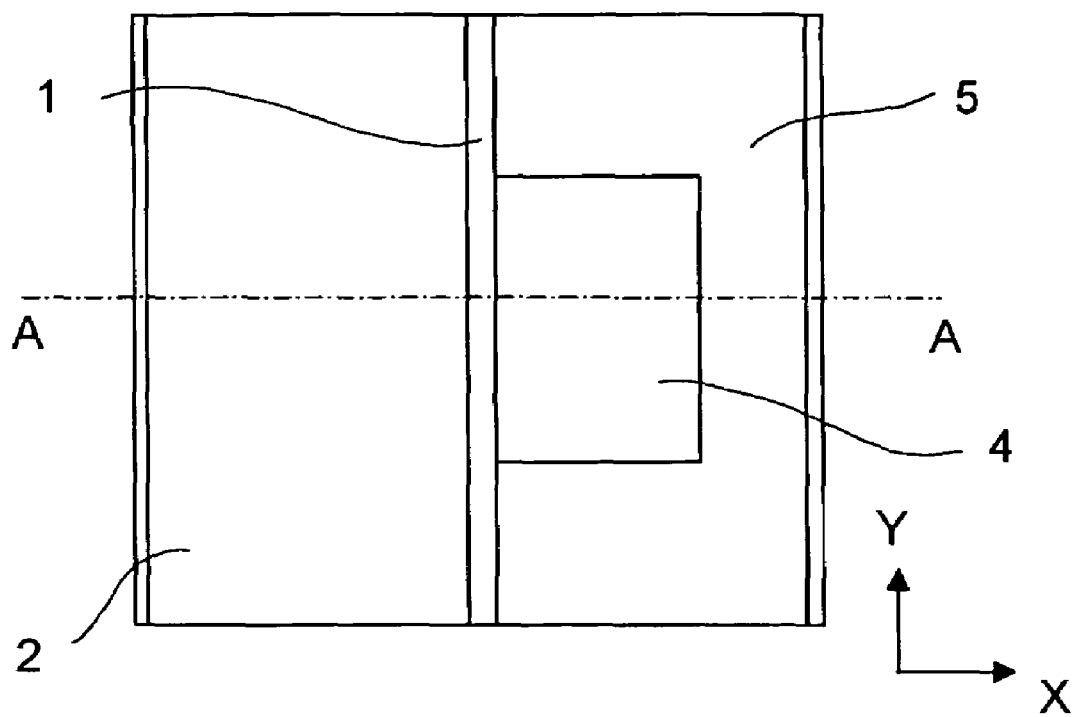
FIG. 6A is a view, when viewed from above, of an electron emitting device according to an example 4 of the present invention
Figure 6B:
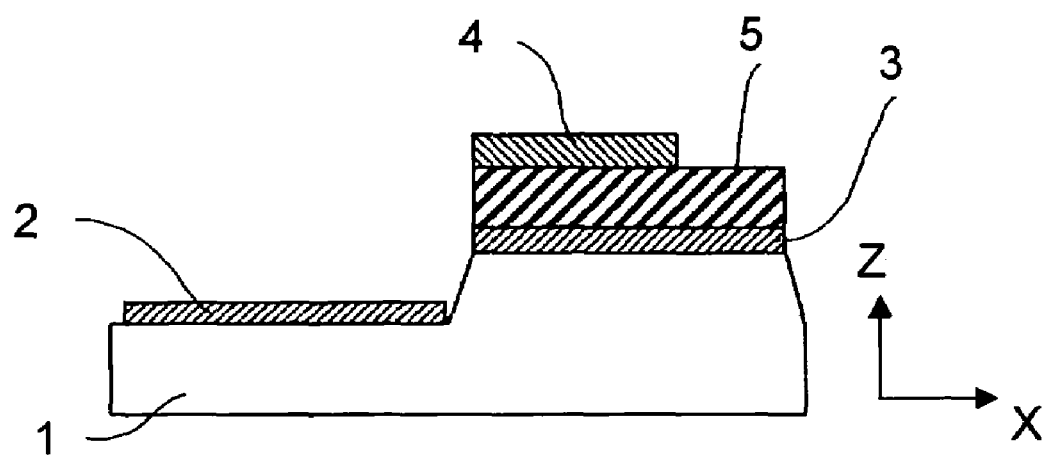
FIG. 6B is a sectional view taken on a line A-A in FIG. 6A.

The construction of an electron emitting device according to an example 4 of the present invention is shown in FIG. 6A and FIG. 6B. In the present embodiment, the steps 1, 2, and 3 described in the embodiment 1 are changed in the manner described below.

(Step 1)

A quartz substrate was used for the substrate 1. The substrate 1 was sufficiently cleaned, and then Cr and Pt were vapor-deposited continuously in thicknesses of 5 nm and 30 nm, respectively, on the substrate 1 by the sputtering method.

(Step 2)

The sputtering unit was sufficiently evacuated and then a substrate temperature was set at 25° C. to 300° C. An Argon gas was mixed with a nitrogen gas and the pressure of the mixed gas was kept on the order of from approximately 0.4 Pa to 10 Pa. $Ti_xSi_{(1-x)}N$ was vapor-deposited on the substrate in a thickness of 500 nm by the use of a $Ti_7Si_3$ target having an atomic ratio of Si of 30% or less by the reactive sputtering method.

(Step 3)

Next, the substrate was sufficiently cooled to room temperature and then an alloy including Pd and 50 atm % Ni and of the order of an amount of forming an island was vapor-deposited by the use of the same vacuum unit as in the step 2 by the sputtering method using an Ar gas.

Next, in the photolithography process, a resist pattern was formed by the use of a positive photoresist. By using the above-mentioned patterned photoresist as a mask, the $Ti_xSi_{(1-x)}N$ layer was dry-etched by a $CF_4$ gas to thereby form the member 5 and then the Pt layer and the Cr layer were dry-etched by an Ar gas to thereby form the electrode 3.

Next, the quartz substrate was etched in a depth of approximately 500 nm by the use of a mixed acid including hydrofluoric acid and ammonium fluoride by using the electrode 3 as a mask.

Next, Cr and Pt were vapor-deposited continuously in thicknesses of 5 nm and 30 nm, respectively, again by the sputtering method so as to form the control electrode 2. The photoresist on the electrode 3 was removed and then a resist pattern for forming the shape of a control electrode was formed by the use of the positive photoresist. The Pt layer and the Cr layer were dry-etched by the use of an Ar gas by using the above-mentioned patterned photoresist as a mask to thereby form the control electrode 2.

The step of the substrate 1 formed between the control electrode 2 and the electrode 3 acts as the gap between the control electrode 2 and the electrode 3. According to the method of the present example, it was possible to form a fine gap between the electrodes and hence to emit electrons at approximately 6 V. Moreover, because the electron emitting material had a large height (film thickness) and hence could emit electrons not only from the top of the film but also from the middle position, the electrons could be prevented from colliding with the control electrode 2, which resulted in making it possible to prevent a decrease in efficiency and an increase in the diameter of beam.

EXAMPLE 5

Figure 15:
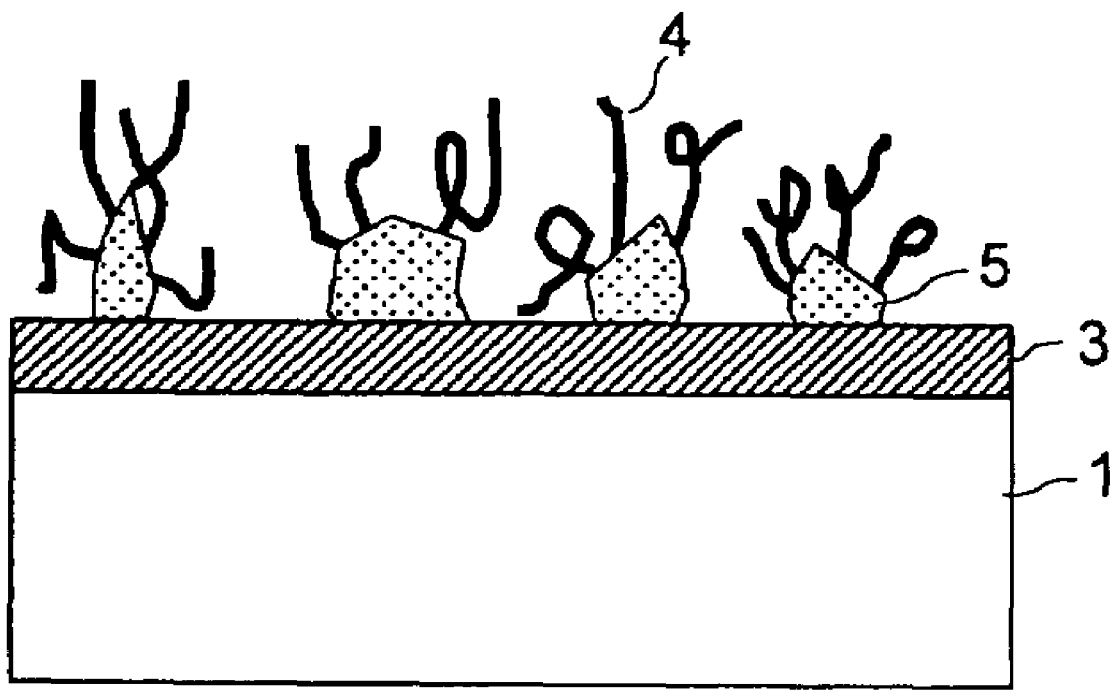
FIG. 15 is a sectional view of an electron emitting film according to an example 5 of the present invention.

An electron emitting film according to an example 5 of the present invention is shown in FIG. 15 and FIG. 16. In the present example, the member of the present invention was pulverized into fine particles and the fine particles of the member were applied in a diffusing manner. In FIG. 15 and FIG. 16, a reference numeral 1 denotes the substrate (supporting substrate), 3 denotes the electrode, 5 denotes a particle-shaped member having conductivity (also referred to as "a conductive particle"), 4 denotes the carbon fiber, and 6 denotes a catalytic particle. The member 5 in the present example is such that a member material according to the present invention was pulverized into fine particles.

Hereinafter, the manufacturing process of an electron emitting film will be described in detail by the use of FIG. 16.

Figure 16A:
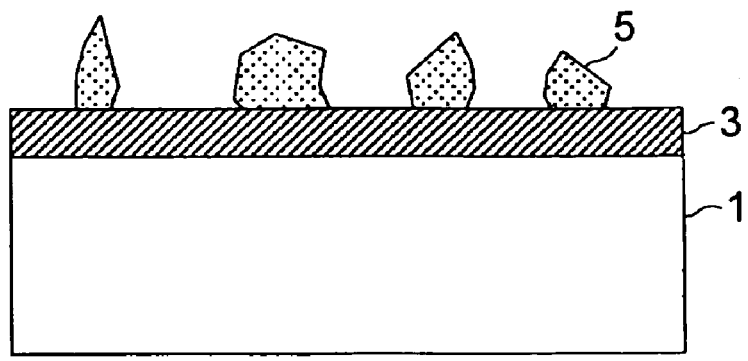
FIG. 16A to FIG. 16C are diagrams showing the steps of manufacturing the electron emitting film according to the example 5.

(Step 1: Refer to FIG. 16A)

A stainless-based alloy material was used as the substrate 1. The substrate 1 was sufficiently cleaned and then an Ag paste was applied by printing in a thickness of 1 μm and then was baked at approximately 500° C. to vaporize organic components to thereby form the electrode 3. Thereafter, the member 5 was placed on the electrode 3 by a method for spraying the particle-shaped member 5, which was formed by pulverizing TiAlN into particles of a particle size of approximately 1 μm and mixing the pulverized TiAlN particles in an alcohol-based solution, from a spray nozzle with air while stirring.

At this time, the amounts of alcohol-based solution and particles, the amount of air to be fed at the time of spraying, and the distance between the nozzle and the substrate at the time of application were adjusted in such a way that the distances between the particles of the member 5 were larger than their average diameter.

Figure 16B:
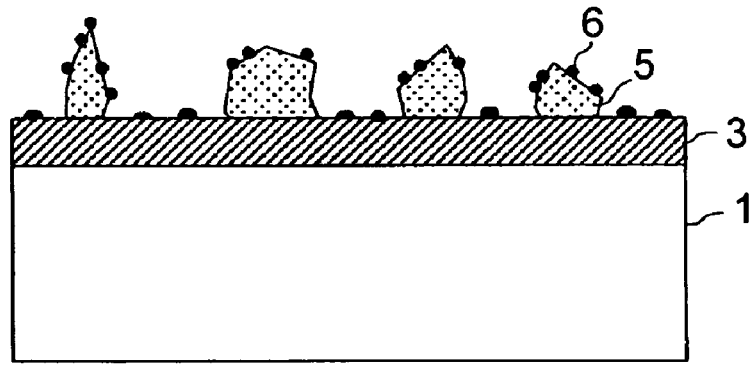

(Step 2: Refer to FIG. 16B)

The substrate 1 was heated in a nitrogen atmosphere at approximately 300° C. such that the member 5 well conformed to Ag. Next, an alcohol-based solution including catalytic particles 6 containing Pd—Co (50 atm %) was applied to the member 5 and the electrode 3 by an ink jet method. In the present invention, the method for placing the catalytic particles 6 is not limited to the ink jet method. The catalytic particles 6 in the solution were treated so as not to aggregate together and the average diameter of the catalytic particles 6 was from 10 nm to 30 nm.

Figure 16C:
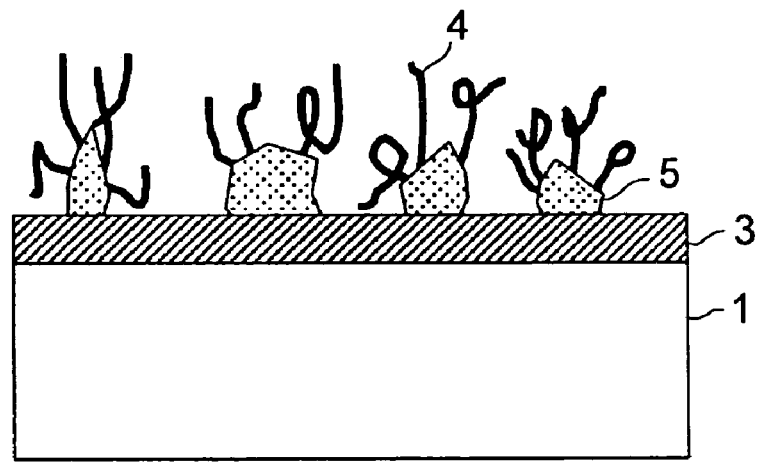

(Step 3: Refer to FIG. 16C)

Next, the substrate 1 was at heated atmospheric pressure in a gas flow of 2% hydrogen and 0.01% acetylene diluted with nitrogen at 500° C. for 10 minutes to thereby form a plurality of carbon fibers 4 on the particle-shaped member 5.

Observations of this by a scanning electron microscope revealed that many carbon fibers 4 each having a diameter of from approximately 5 nm to 25 nm and bending and extending in the shape of a fiber were formed on the member 5. At this time, the thickness of the film of the carbon fibers 4 became approximately 1000 nm. Moreover, these carbon fibers 4 were not found on the electrode 3 made of Ag but were formed only on the member 5.

In the present example, the catalytic particles 6 were formed by a step different from the step of forming the member 5. However, by mixing the catalytic particles 6 in the solution including the member 5 and by applying the mixed solution to the electrode 3, it is also possible to omit the above-mentioned step (step 2) of forming the catalysts and to form the member 5 and the catalytic particles 6 at the same time by one step.

EXAMPLE 6

In an example 6 of the present invention, the construction of a television using the electron emitting devices described in the above-mentioned example 1 will be described with reference to FIG. 10, FIG. 11, and FIG. 12.

In FIG. 10, a reference numeral 81 denotes the electron source substrate (rear plate), 82 denotes the wirings in the X direction, 83 denotes the wirings in the Y direction, and 84 denotes the above-mentioned electron emitting device of the example 1.

The m wirings 82 in the X direction are comprised of Dx1, Dx2, . . . , and Dxm and are constructed of an aluminum-based wiring material formed by the use of the vacuum vapor deposition method and having a thickness of approximately 1 μm and a width of approximately 300 μm. The n wirings 83 in the Y direction are comprised of Dy1, Dy2, . . . , and Dyn and are constructed of the aluminum-based wiring material formed by the use of the vacuum vapor deposition method and having a thickness of approximately 0.5 μm and a width of approximately 100 μm. Between the m wirings 82 in the X direction and the n wirings 83 in the Y direction, there is interposed an interlayer insulating layer (not shown) for electrically separating both of the wirings 82, 83.

The interlayer insulating layer is constructed of $SiO_2$ in a thickness of approximately 0.8 μm by the use of the sputtering method. The interlayer insulating layer is formed in a desired shape on the whole or a portion of the electron source substrate 81 having the wirings 82 in the x direction formed thereon. In the present embodiment, the film thickness of the interlayer insulating layer was determined as appropriate in such a way as to endure the electric potential differences at the intersections of the wirings 82 in the X direction and the wirings 83 in the Y direction, that is, in such a way that the element capacity and element breakdown voltage of one element were 1 pF or less and 30 V, respectively. The end portions of the wirings 82 in the X direction and the wirings 83 in the Y direction are drawn out as external terminals.

A pair of electrodes (not shown) of the electron emitting device 84 are electrically connected to the wiring 82 in the X direction and the wiring 83 in the Y direction.

A scanning signal applying unit (not shown) for applying a scanning signal for selecting the row of the electron emitting devices 84 arranged in the X direction is connected to the wirings 82 in the X direction, whereas a modulation signal generating unit (not shown) for modulating, in synchronization with the scanning signal, the amount of emission of electrons from each row of the electron emitting devices 84 arranged in the Y direction is connected to the wirings 83 in the Y direction. A driving voltage applied to each electron emitting device 84 is supplied as the difference voltage between the scanning signal and the modulation signal applied to the element 84. In the present embodiment, the scanning signal and the modulation signal are generated in such a way that the wirings 83 in the Y direction are at high electric potential and that the wirings 82 in the X direction are at low electric potential.

FIG. 11 shows the image display panel (externally enclosed unit) constructed by the use of the above-mentioned electron sources having the electron emitting devices arranged in a matrix. In FIG. 11, a reference numeral 81 denotes the electron source substrate (rear plate) having the plurality of electron emitting devices 84 placed thereon, and 96 denotes a face plate having a fluorescent film 94, a metal back 95, and the like formed on the internal surface of a glass substrate 93. In the present embodiment, a soda lime glass was used as the material of the electron source substrate 81. A reference numeral 92 is a supporting frame, and the rear plate 81 and the face plate 96 are connected to the supporting frame 92 by the use of indium.

The externally enclosed unit (image display panel) 97, as described above, is constructed of the face plate 96, the supporting frame 92, and the rear plate 81. By interposing a supporting part (not shown) called a spacer between the face plate 96 and the rear plate 81, the externally enclosed unit 97 was made to have sufficient strength to the atmospheric pressure.

The metal back 95 (corresponding to an anode electrode) was made by smoothing (usually referred to as "filming") the inside surface of the fluorescent film 94 after forming the fluorescent film 94 and then by depositing Al by the vapor deposition method or the like. In the face plate 96, to further enhance the conductivity of the fluorescent film 94, a transparent electrode (not shown) was formed on the outer surface of the fluorescent film 94.

In the present example, electrons are emitted from the carbon fibers to the control electrode (gate electrode) and hence the anode voltage was set at 10 kV and the distance between the anode and the rear plate was set at 2 mm and the fluorescent body was arranged at an offset position 200 μm closer to the gate from above the carbon fiber.

As shown in FIG. 12, to the externally enclosed unit (image display panel) 97 of the present example formed in this manner were connected the receiving circuit 70 having a TV tuner, the interface unit 71, the control circuit 73 for performing Y correction, and the drive circuit 74 for outputting voltage to be applied to the wirings in the X direction and the wirings in the Y direction, which were connected to the electron emitting device 84. Then, when a TV signal was received and was displayed on the image display panel made in the present example, a clear brighter image could be stably displayed for a long. time.

This application claims priority from Japanese Patent Application No. 2004-299769 filed Oct. 14, 2004, which is hereby incorporated by reference herein.

What is claimed is:

1. A structure, comprising:
a film; and
a carbon fiber placed on said film,
wherein said film is comprised of $Ti_xSi_{1-x}N$ ($0<x<1$), and a ratio of Si to Ti is not less than 10 atm % and not more than 30 atm %.

2. An electron emitting device comprising:
a cathode electrode;
a film placed on said cathode electrode; and
a carbon fiber placed on said film,
wherein said film is comprised of $Ti_xSi_{1-x}N$ ($0<x<1$), and a ratio of Si to Ti is not less than 10 atm % and not more than 30 atm %.

3. A secondary battery comprising:
a cathode electrode;
a film placed on said cathode electrode; and
a carbon fiber placed on said film;
an anode electrode,
wherein said film is comprised of $Ti_xSi_{1-x}N$ ($0<x<1$), and
wherein a ratio of Si to Ti is not less than 10 atm % and not more than 30 atm %.

4. A structure according to claim 1, wherein $Si_3N_4$ is formed at a grain boundary of TiN crystal in said film.

5. An electron emitting device according to claim 2, wherein $Si_3N_4$ is formed at a grain boundary of TiN crystal in said film.

6. A second battery according to claim 3, wherein $Si_3N_4$ is formed at a grain boundary of TiN crystal in said film.

* * * * *